United States Patent
Lee et al.

(10) Patent No.: US 11,705,110 B2
(45) Date of Patent: Jul. 18, 2023

(54) ELECTRONIC DEVICE AND CONTROLLING THE ELECTRONIC DEVICE

(71) Applicant: Samsung Electronics Co., Ltd., Suwon-si (KR)

(72) Inventors: Kyenghun Lee, Suwon-si (KR); Hyeonmok Ko, Suwon-si (KR); Kunal Sharma, Bengaluru (IN); Raghavendra Hanumantasetty Ramasetty, Bengaluru (IN); Jinyeol Kim, Suwon-si (KR); Kooktae Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 17/104,601

(22) Filed: Nov. 25, 2020

(65) Prior Publication Data
US 2021/0166678 A1 Jun. 3, 2021

(30) Foreign Application Priority Data
Nov. 28, 2019 (KR) ........................ 10-2019-0156158

(51) Int. Cl.
*G10L 15/22* (2006.01)
*G10L 15/06* (2013.01)
*G10L 15/30* (2013.01)

(52) U.S. Cl.
CPC ............ *G10L 15/063* (2013.01); *G10L 15/22* (2013.01); *G10L 15/30* (2013.01); *G10L 2015/223* (2013.01)

(58) Field of Classification Search
CPC ........ G10L 15/063; G10L 15/22; G10L 15/30
See application file for complete search history.

(56) References Cited

U.S. PATENT DOCUMENTS 8,000,969 B2 8/2011 Da Palma et al.
9,171,542 B2 10/2015 Gandrabur et al.
(Continued)

FOREIGN PATENT DOCUMENTS

JP 2019-124855 A 7/2019
KR 10-2015-0116389 A 10/2015
(Continued)

OTHER PUBLICATIONS

International Search Report dated Jan. 20, 2021, issued in International Application No. PCT/KR2020/013708.

*Primary Examiner* — Ibrahim Siddo
(74) *Attorney, Agent, or Firm* — Jefferson IP Law, LLP

(57) ABSTRACT

An electronic device and a method for controlling thereof are provided. The electronic device includes a communicator comprising circuitry, a microphone, at least one memory configured to store at least one instruction and dialogue history information, and a processor configured to execute the at least one instruction, and the processor, by executing the at least one instruction, is further configured to determine whether to transmit, to a server storing a first dialogue system, a user speech that is input through the microphone, based on determining that the user speech is transmitted to the server, control the communicator to transmit the user speech and at least a part of the stored dialogue history information to the server, receive, from the server, dialogue history information associated with the user speech, through the communicator, and control the received dialogue history information to be stored in the memory.

16 Claims, 18 Drawing Sheets

(56) References Cited

U.S. PATENT DOCUMENTS

| | | |
|---|---|---|
| 9,640,183 B2 | 5/2017 | Jung et al. |
| 10,074,372 B2 | 9/2018 | Jung et al. |
| 10,643,621 B2 | 5/2020 | Jung et al. |
| 10,650,816 B2 | 5/2020 | Lee et al. |
| 2008/0120094 A1 | 5/2008 | Mate et al. |
| 2015/0279352 A1 | 10/2015 | Willett et al. |
| 2015/0287413 A1 | 10/2015 | Jung et al. |
| 2017/0236519 A1 | 8/2017 | Jung et al. |
| 2018/0232664 A1 | 8/2018 | Gelfenbeyn et al. |
| 2018/0270350 A1* | 9/2018 | Engelke .................. G10L 15/26 |
| 2018/0276201 A1* | 9/2018 | Choi ....................... G06N 3/084 |
| 2018/0277113 A1* | 9/2018 | Hartung .................. G10L 15/22 |
| 2018/0307682 A1 | 10/2018 | Sharma et al. |
| 2018/0322870 A1 | 11/2018 | Lee et al. |
| 2019/0080696 A1 | 3/2019 | Jung et al. |
| 2019/0172465 A1 | 6/2019 | Lee et al. |
| 2019/0295549 A1 | 9/2019 | Oh et al. |
| 2019/0392819 A1 | 12/2019 | Shin et al. |
| 2021/0035576 A1 | 2/2021 | Kang et al. |

FOREIGN PATENT DOCUMENTS

| | | |
|---|---|---|
| KR | 10-2018-0022021 A | 3/2018 |
| KR | 10-2018-0084591 A | 7/2018 |
| KR | 10-2018-0108400 A | 10/2018 |
| KR | 10-2019-0096307 A | 8/2019 |
| KR | 10-2019-0100512 A | 8/2019 |

\* cited by examiner

FIG. 1A
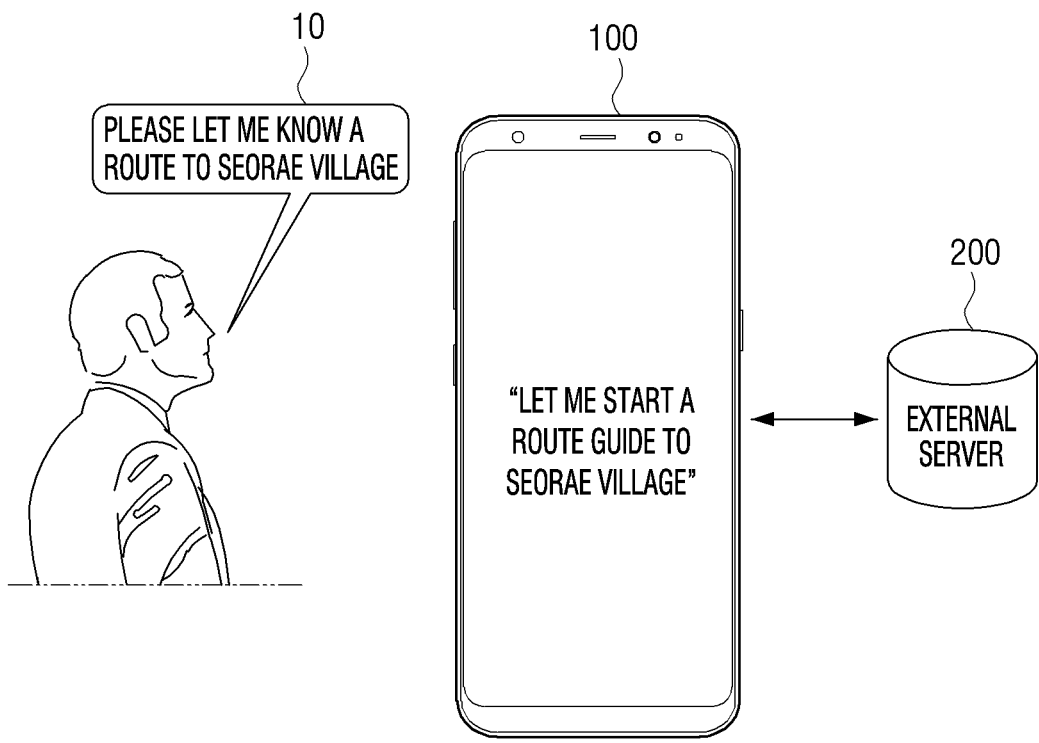
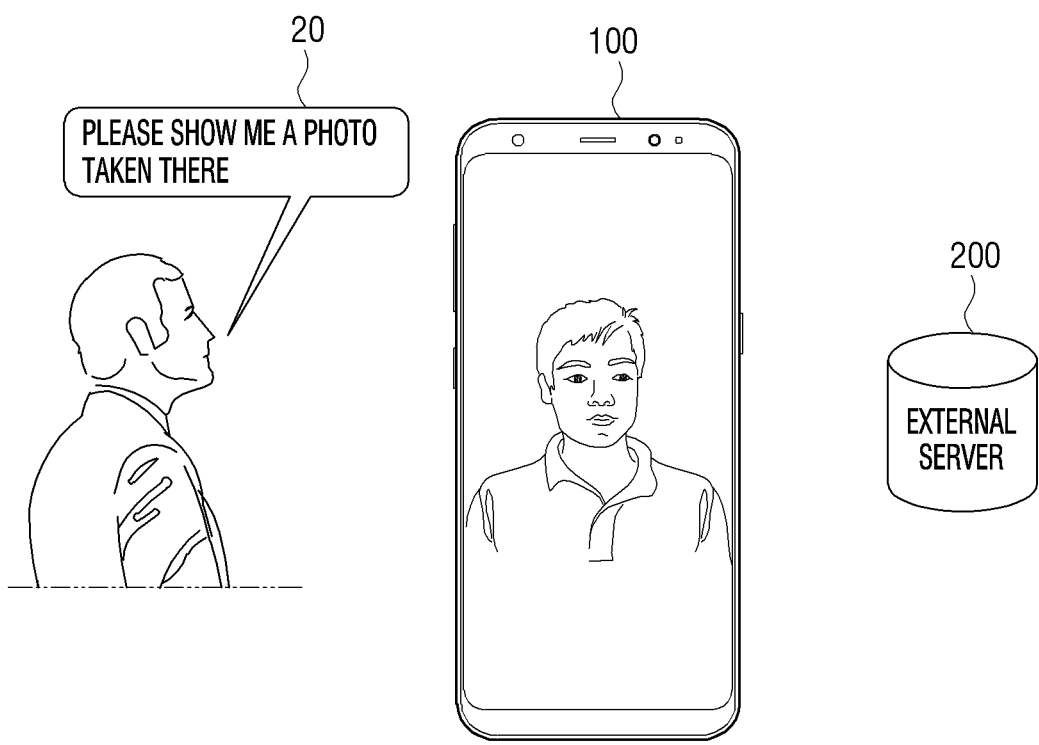

FIG. 1B
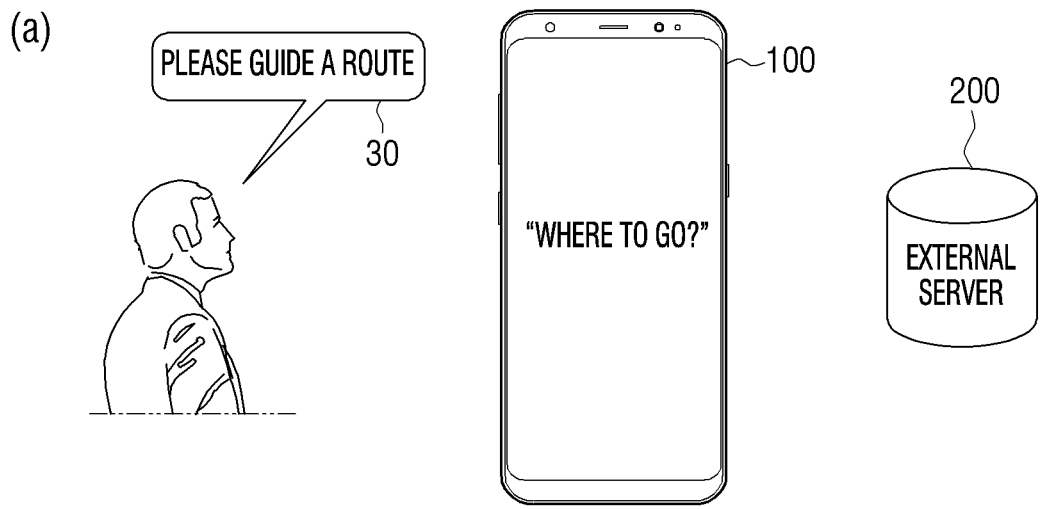
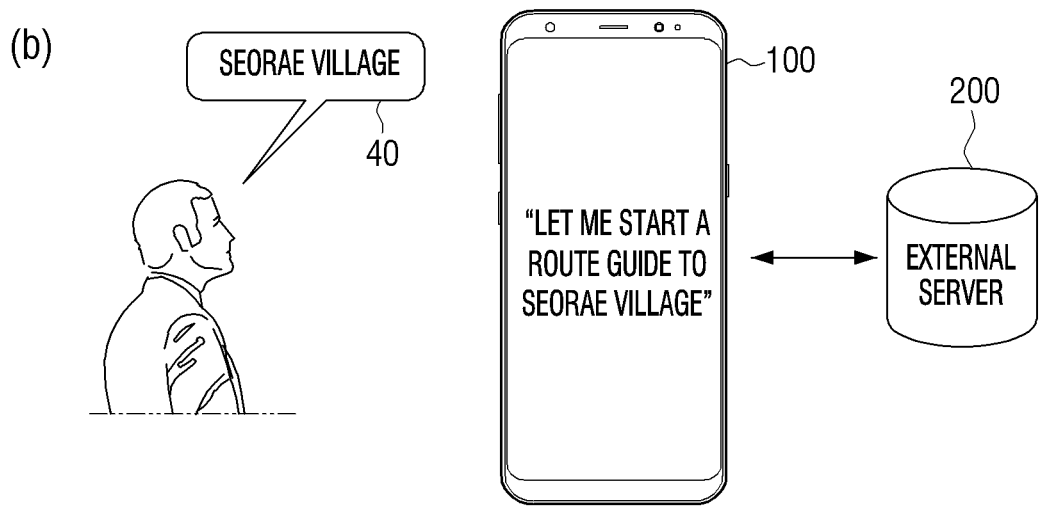
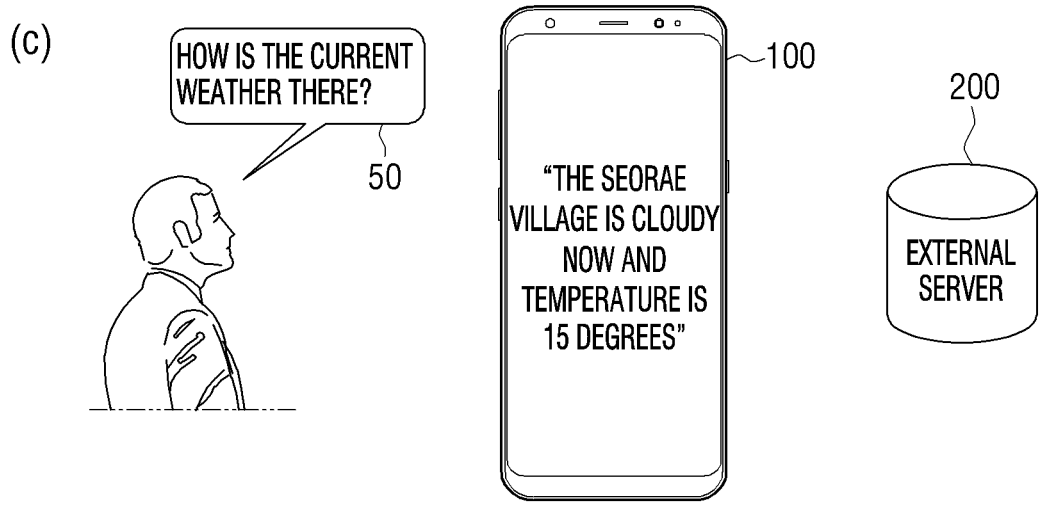

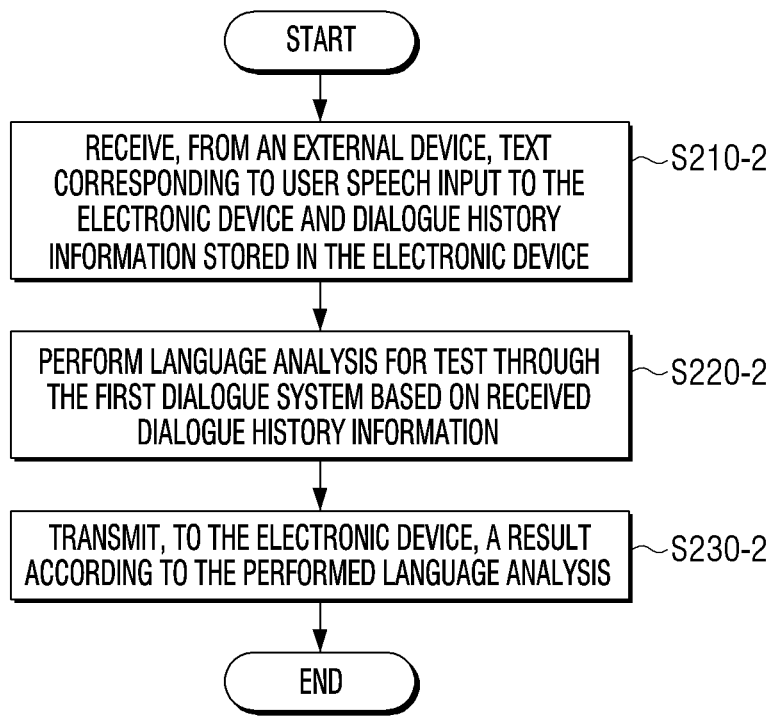

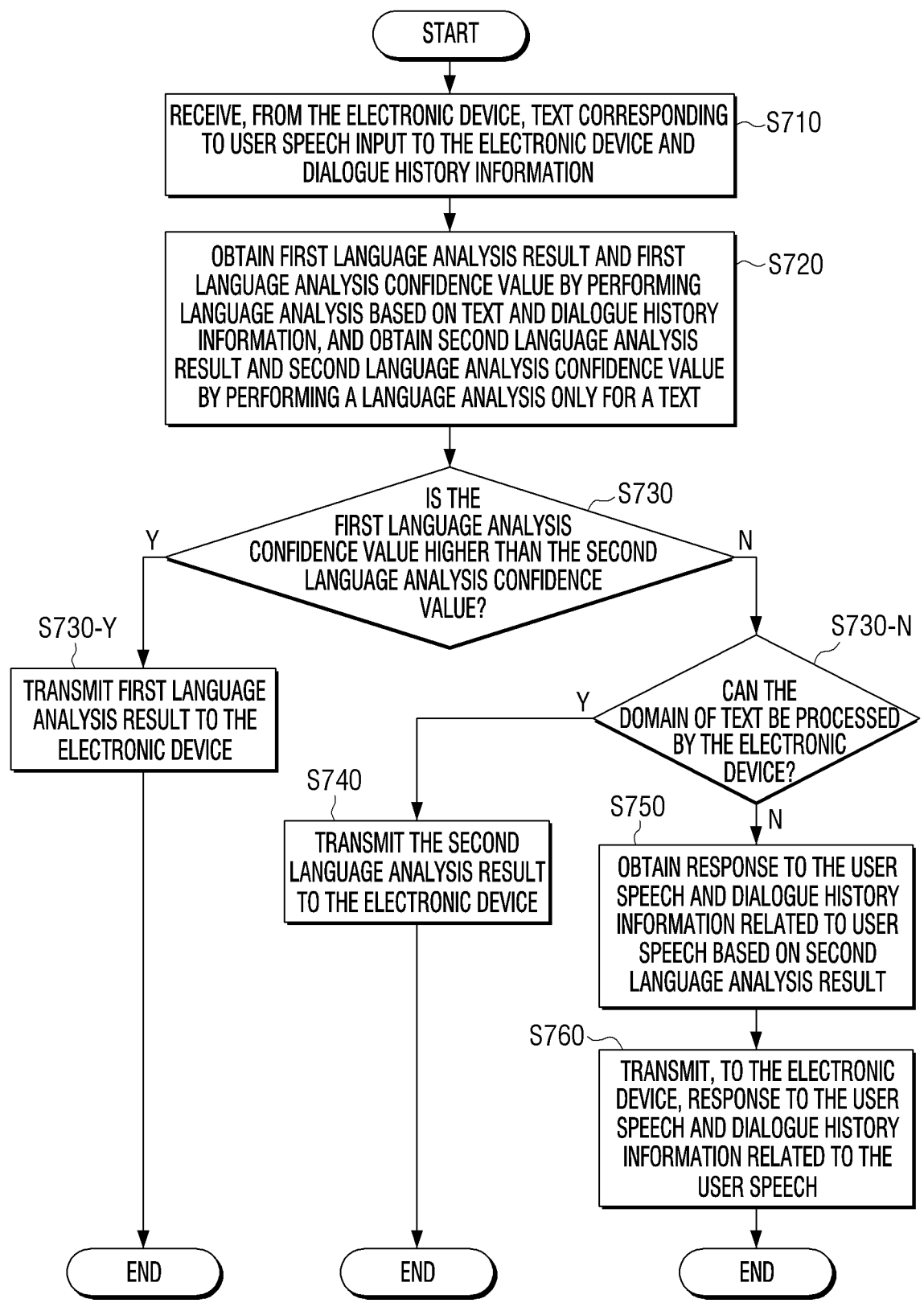

ELECTRONIC DEVICE AND CONTROLLING THE ELECTRONIC DEVICE

CROSS-REFERENCE TO RELATED APPLICATION(S)

This application is based on and claims priority under 35 U.S.C. § 119(a) of a Korean patent application number 10-2019-0156158, filed on Nov. 28, 2019, in the Korean Intellectual Property Office, the disclosure of which is incorporated by reference herein in its entirety.

BACKGROUND

1. Field

The disclosure relates to an electronic device and a method for controlling an electronic device. More particularly, the disclosure relates to an electronic device for determining a dialogue system to provide a response to a user speech based on a speech recognition result for the input user speech and a controlling method thereof.

2. Description of Related Art

Artificial intelligence (AI) systems are computer systems that implement human-level intelligence in which the machine learns, determines and becomes intelligent, unlike the existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

The AI technology may include machine learning (for example, deep learning) and element technologies which utilize machine learning.

Machine learning is an algorithm technology that is capable of classifying or learning characteristics of input data. Element technology is a technology that simulates functions, such as recognition and judgment of a human brain using machine learning algorithms, such as deep learning. Machine learning is including technical fields, such as linguistic understanding, visual understanding, reasoning, prediction, knowledge representation, motion control, or the like. Linguistic understanding is a technology for recognizing, applying, and/or processing human language or characters and includes natural language processing, machine translation, dialogue system, question and answer, speech recognition or synthesis, and the like.

A user can utilize an artificial intelligence system stored in a device or a server to perform speech recognition technology using machine learning. In the related-art, based on one of the artificial intelligence systems stored in the device or the server being selected according to a network situation of a device, only the selected artificial intelligence system is used to perform speech recognition technology.

In the related art, based on the network conditions of the device being changed, the used artificial intelligence system is switched, and task information performed is not shared between the switched artificial intelligence systems. Thus, there is a limit that the switched artificial intelligence system should have to iterate a query to obtain the necessary information to perform the requested task.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for controlling thereof.

Additional aspects will be set forth in part in the description which follows and, in part, will be apparent from the description, or may be learned by practice of the presented embodiments.

In accordance with an aspect of the disclosure, an electronic device is provided. The electronic device includes a communicator comprising circuitry, a microphone, at least one memory configured to store at least one instruction and dialogue history information, and a processor configured to execute the at least one instruction, and the processor, by executing the at least one instruction, is further configured to determine whether to transmit, to a server storing a first dialogue system, a user speech that is input through the microphone, based on determining that the user speech is transmitted to the server, control the communicator to transmit the user speech and at least a part of the stored dialogue history information to the server, receive, from the server, dialogue history information associated with the user speech, through the communicator, and control the received dialogue history information to be stored in the memory.

In accordance with another aspect of the disclosure, a server is provided. The server includes a communicator comprising circuitry, at least one memory configured to store at least one instruction and a first dialogue system, and a processor configured to execute the at least one instruction, and the processor, by executing the at least one instruction, is further configured to receive, from an electronic device, a text corresponding to a user speech input to the electronic device and dialogue history information stored in the electronic device, through the communicator, perform a language analysis for the text through the first dialogue system based on the dialogue history information, and control the communicator to transmit a result according to the performed language analysis to the electronic device, and the received text is processed through a second dialogue system stored in the electronic device.

In accordance with another aspect of the disclosure, a method of controlling an electronic device is provided. The method includes determining whether to transmit, to a server including a first dialogue system, an input user speech, based on determining that the user speech is transmitted to the server, transmitting the user speech and at least a part of the stored dialogue history information to the server, receiving, from the server, dialogue history information associated with the user speech, and storing the received dialogue history information.

In accordance with another aspect of the disclosure, a method of controlling a server comprising at least one memory storing a first dialogue system is provided The method includes receiving, from an electronic device, a text corresponding to a user speech input to the electronic device and dialogue history information stored in the electronic device, performing a language analysis for the text through the first dialogue system based on the dialogue history information and transmitting a result according to the performed language analysis to the electronic device, and the received text is processed through a second dialogue system stored in the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A is a diagram illustrating a process of determining a dialogue system for transmitting an input user speech by an electronic device according to an embodiment of the disclosure;

FIG. 1B is a diagram illustrating a process of determining a dialogue system for transmitting an input user speech by an electronic device according to various embodiments of the disclosure;

FIG. 2B is a flowchart illustrating a controlling method of a server according to an embodiment of the disclosure;

FIG. 5 is a flowchart illustrating a controlling method of a server according to an embodiment of the disclosure;

Throughout the drawings, it should be noted that like reference numbers are used to depict the same or similar elements, features, and structures.

DETAILED DESCRIPTION

Figure 2A:
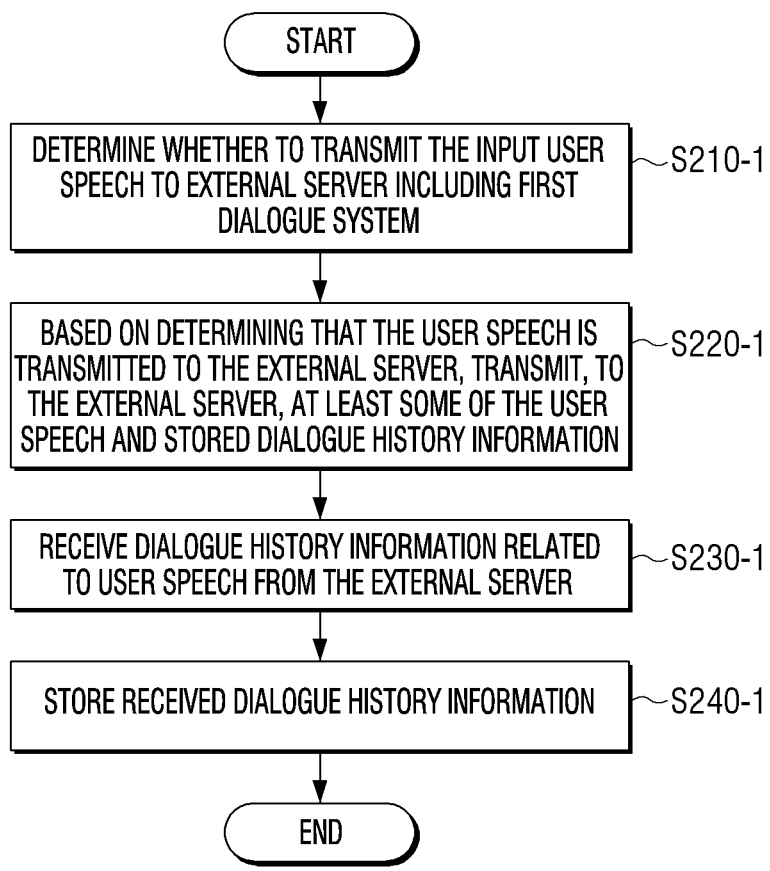
FIG. 2A is a flowchart illustrating a controlling method of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An aspect of the disclosure is to provide an electronic device for determining a dialogue system to provide a response to a user speech based on a speech recognition result of a user speech and providing a response to the user speech by inputting user speech and dialogue history information to the determined dialogue system, and a controlling method thereof.

FIG. 1A is a diagram illustrating a method of controlling an electronic device according to an embodiment of the disclosure.

Referring to FIG. 1A, an electronic device 100 according to an embodiment may determine whether to transmit an input user speech 10 (e.g., "please guide a route to "Seorae Village") to a server 200 that includes a first dialogue system. Specifically, the electronic device 100 may enter the user speech 10 into a second dialogue system to obtain a confidence value (e.g., a speech recognition confidence value or a language analysis confidence value) or domain of the user speech 10, and determine whether to transmit the user speech 10 to the server 200 based on the obtained confidence value or domain. A process of determining whether the electronic device 100 transmits the user speech 10 to the server 200 will be described in detail with reference to FIG. 2A.

A domain may denote a type of data obtained as a result of semantic analysis of a speech or a text and may refer to a kind of category classified according to the type of user intent corresponding to a speech or text, or according to the type of a control command corresponding to the speech or text. For example, if the user speech "Let me know today's weather" is input, the domain of the user speech may be "Weather". The domain may be the same as a user intent or control command, and one domain may include a plurality of user intent or control commands.

A dialogue system may include an artificial intelligence model that recognizes and analyzes the input user speech and provides a response to the user speech. The first dialogue system stored in the server 200 may be an artificial intelligence model trained using a greater amount of learning data than the second dialogue system stored in the electronic device 100, or an artificial intelligence model having a greater amount of data than the amount of data in the second dialogue system stored in the electronic device 100. An artificial intelligence model trained by using a large amount of learning data can output a recognition result having high reliability for the same input speech, compared to an artificial intelligence model trained using a relatively small amount of learning data. The artificial intelligence model trained using a large amount of learning data can control the electronic device to perform the functions associated with the domain by processing speech associated with more domains, compared to an artificial intelligence model trained using a relatively small amount of learning data. Similarly, an artificial intelligence model with a large amount of data can output a recognition result with a high degree of confidence for the same input speech, as compared to an artificial intelligence model having a relatively small amount of data. An artificial intelligence model with a large amount of data can control the electronic device to perform the functions associated with the domain by processing speech associated with more domains, as compared to an artificial intelligence model having a relatively small amount of data. An artificial intelligence model having a large amount of data is a model trained using a large amount of learning data compared to an artificial intelligence model having a relatively small amount of data. The first dialogue system may output a speech recognition result having a high confidence value or a language analysis result having a high confidence value relative to the user speech 10, as compared to the second dialogue system. The first dialogue system may perform a function associated with a domain which the second dialogue system may not process.

As an embodiment of the disclosure, if it is determined that the user speech 10 is transmitted to the server 200, the electronic device 100 may transmit, to the server 200, at least a portion of the user speech 10 and the stored dialogue history information that includes the first dialogue system. In yet another embodiment of the disclosure, the electronic device 100 may transmit, to the server 200, at least a portion of the text and stored dialogue history information corresponding to the user speech 10 obtained via the second automatic speech recognition (ASR) module of the second dialogue system.

The dialogue history information is associated with the user speech 10 and includes information about the speech recognition result, the language analysis result, or the response of the dialogue system obtained before the user speech 10 is input. The dialogue history information may further include information on the task that the electronic device 100 has performed before the user speech 10 is input and the state information of the electronic device 100 at the time when the user speech is input, or the like.

The server 200 may input at least a portion of the dialogue history information stored in the electronic device 100 and the text corresponding to the user speech 10 received from the electronic device 100 to the first dialogue system to perform a language analysis on the text corresponding to the user speech 10. As another embodiment of the disclosure, based on receiving a user speech from the electronic device 100, the server 200 may obtain text corresponding to the user speech through the first dialogue system.

The server 200 may transmit the results according to the language analysis for the text to the electronic device 100. Specifically, the server 200 can obtain a first language analysis result and a first language analysis confidence value through language analysis of the text based on dialogue history information, and can obtain a second language analysis result and a second language analysis confidence value through language analysis of only the text. The server 200 can transmit one of the first language analysis result and the second language analysis result to the electronic device 100 based on the first and second language analysis confidence values. An embodiment of the operation of the server 200 will be described in detail with reference to FIG. 2B.

According to one embodiment of the disclosure, the electronic device 100 may receive and store dialogue history information associated with the user speech 10 from the server 200. The dialogue history information associated with the user speech 10 shown in FIG. 1A may be contextual information that requires road guidance to the location of the named "Seorae Village." Specifically, the dialogue history information may include information about a situation requiring a road guide, information about a destination of a route guide "Seorae Village" of the user, application information about whether an application capable of providing a route guidance service is installed on the electronic device 100, and information about whether the communication connection between the electronic device 100 and the server 200 is performed.

In an embodiment of the disclosure, the information on a situation requesting road guidance and information on a destination of route guide of "Seorae Village" may be information obtained through a speech recognition result and a language analysis result. The form of the dialogue history information may be a speech or natural language form but is not limited thereto.

In one embodiment of the disclosure, the dialogue history information may include the user speech or at least a portion of text for user speech. The dialogue history information may further include information about the response provided by the dialogue system. Specifically, the information about the response provided by the dialogue system may be at least a portion of the natural language sentence for the response message provided by the dialogue system or at least a portion of the information used by the dialogue system to generate the natural language sentence.

Meanwhile, the electronic device 100 may receive a response corresponding to the user speech 10 from the server 200 and control the electronic device 100 to perform an operation corresponding to the response. In one embodiment of the disclosure, the electronic device 100 may receive a response to the user speech 10 that "perform a route guidance to a location named Seorae Village" from the server 200. Here, the response means information about the response message to be output through the electronic device 100, and the information about the response message may include a natural language sentence to be output by the electronic device 100 or information for generating a natural language sentence. The response may denote information about the operation that the electronic device 100 will perform, and the information about the operation may include information about the application to be executed by the electronic device 100 or information about the details of the application to be performed.

For example, the electronic device 100 may output a message "Let me start road guide to Seorae Village" in the form of speech or in the form of text, to correspond to a response received from the server 200. The electronic device 100 can execute an application that guides the road to correspond to the received response and perform a detailed function of starting the road guide to the location of a place named "Seorae Village."

Referring to FIG. 1A, based on an additional user speech 20 (e.g., "please show me a photo taken there") being input, the electronic device 100 may determine whether to transmit the input additional user speech 20 to the server 200. The electronic device 100 may input the additional user speech 20 into the second dialogue system to determine whether to transmit the same to the server 200. The process of determining whether the electronic device 100 is to transmit the additional user speech 20 to the server 200 will be described in detail with reference to FIG. 2A.

If it is determined that additional user speech 20 is not transmitted to the server 200, the electronic device 100 can recognize a speech or analyze language of the additional user speech 20 using dialogue history information associated with the user speech 10 among the dialogue history information previously stored in the second dialogue system, and may obtain the response to the additional user speech 20 and the dialogue history information associated with the additional user speech 20. The dialogue history information associated with the user speech 10 may include information related to the dialogue that was input or responded to, before the additional user speech 20 is input. The electronic device 100 may set a predetermined number of times to obtain information related to the dialogue that was input or responded to within a predetermined number of times, among dialogues previously input or responded to. The electronic device 100 may perform speech recognition or language analysis on the additional user speech 20 to obtain information about the dialogue associated with speech recognition results or language analysis results during the dialog that was previously input or responded to.

The electronic device 100 can utilize the dialogue history information associated with the user speech 10 received from the server 200 before the additional user speech 20 is input to obtain dialogue history information and responses associated with the additional user speech 20. In one embodiment of the disclosure, through the contextual information requiring route guide to the location of the electronic device, it may be identified that the text corresponding to the speech "there" 'included in the additional user speech 20 means the location name "Seorae Village".

The dialogue history information associated with the additional user speech 20 may include information about a situation requiring a photo search associated with "Seorae Village", application information that an application capable of searching photographs stored in the electronic device 100 is installed, and communication connection state information between the electronic device 100 and the server 200 at the time when the second user speech 20 is input, but this is only one embodiment.

The electronic device 100 may perform a function corresponding to a response to the additional user speech 20. In one embodiment of the disclosure, the electronic device 100 may output a speech "the photo is taken at Seorae Village," as a response to the additional user speech 20. The electronic device 100 can execute an application capable of displaying a photo to correspond to a response and control so that a photo of which position information is "Seorae Village" is displayed, among the stored photos. A series of process of outputting a response message in a speech type by inputting by the electronic device 100 the input additional user speech 20 to the first dialogue system and executing a specific application may be similar to an embodiment of guiding a route to the Seorae Village with respect to the user speech 10 as described above.

FIG. 1B is a diagram illustrating a process of determining a dialogue system for transmitting an input user speech by an electronic device according to an embodiment of the disclosure.

Referring to part (a) of FIG. 1B, if a user speech 30 of "please guide a route" is input, the electronic device 100 may determine whether to transmit the user speech 30 to the server 200. For example, the electronic device 100 may input the user speech 30 into a second ASR module of the second dialogue system to obtain text and speech recognition confidence values corresponding to the user speech 30.

In one embodiment of the disclosure, based on the speech recognition confidence value exceeding the first threshold value, the electronic device 100 may obtain the response to the user speech 30 through the second dialogue system and the dialogue history information associated with the user speech 30. The electronic device 100 may store dialogue history information associated with the user speech 30. The dialogue history information associated with the user speech 30 may include, but is not limited to, information about a situation requiring to guide a route by a user, information on whether an application capable of performing road guidance is installed, or the like. The threshold value described in the disclosure can be a predetermined value, but it is only one embodiment and can be changed by a user command.

The electronic device 100 may provide a response to the user speech 30. For example, the electronic device 100 may provide a response message asking a destination for route guidance of "where to go?" as illustrated in part (a) of FIG. 1B.

Referring to part (b) of FIG. 1B, when a user speech 40 "Seorae Village" corresponding to the response to the previous user speech 30 is input, the electronic device 100 can determine whether to transmit the user speech 40 to the server 200. If the speech recognition confidence value for the user speech 40 is less than or equal to the first threshold, the electronic device 100 may transmit the user speech 40 and dialogue history information associated with the pre-stored previous user speech 30 to the server 200.

In one embodiment of the disclosure, the server 200 may obtain the response to the user speech 40 and the dialogue history information associated with the user speech 40 through the first dialogue system based on the received user speech 40 and dialogue history information associated with the previous user speech 30. Specifically, the server 200 may use the dialogue history information associated with the previous user speech 30 included in the situation information that the user is currently requesting a route guidance, so that the intent of the text corresponding to the user speech 40 is to request a route guidance to a destination called "Seorae Village". The server 200 may obtain a response to the user speech 40 through the first dialogue system (e.g., information related to an application that performs a route guidance to Seorae Village and a response message of "Let me start a route guidance to Seorae Village") and dialogue history information (for example, information on a situation of performing a route guidance to a destination of Seorae Village and information on an application for performing a route guidance) related to the user speech 40. The server 200 can transmit a response to the user speech 40 and dialogue history information associated with the user speech 40 to the electronic device 100. As shown in part (c) of FIG. 1B, based on a user speech 50 "how is the weather there?" corresponding to the response to the previous user speech 40 is input, the electronic device 100 can determine whether the user speech 50 is transmitted to the server 200 again. If the speech recognition confidence value of the user speech 50 exceeds the first threshold, the electronic device 100 can identify that the word "there" included in the text corresponding to the current user speech 50 is the destination of Seorae Village", through the dialogue history information associated with the previous user speech. The electronic device 100 may obtain the response to the current user speech 50 and the information associated with the user speech 50 through the second dialogue system. The response to the user speech 50 may be a message for the current weather of the Seorae Village (e.g., "Seorae Village is cloudy now and the temperature is 15 degrees"). The dialogue history information associated with the user speech 50 may include information about the weather condition information and the information about the current weather of Seorae Village.

Referring to FIG. 1B, the electronic device 100 may obtain a response to the user speech by using at least one of the second dialogue system storing the user speech continuously input or dialogue history information for the user speech and the first dialogue system stored in the server 200.

FIG. 2A is a diagram illustrating a controlling method of an electronic device according to an embodiment of the disclosure.

Referring to FIG. 2A, first, the electronic device 100 can determine whether the input user speech is transmitted to the server 200 including the first dialogue system in operation S210-1. Specifically, the electronic device 100 may input a user speech into the second dialogue system to obtain a confidence value or domain of the user speech and determine whether to transmit the user speech to the server 200 based on the obtained confidence value or domain.

In one embodiment of the disclosure, the electronic device 100 may obtain a text corresponding to a user speech and a speech recognition confidence score of user speech through the second ASR module of the second dialogue system. The speech recognition confidence value is a numerical value that indicates how accurately the user speech has been recognized and converted to a text.

The electronic device 100 can determine whether to transmit the user speech to the server 200 based on the speech recognition confidence value of the user speech. For example, if the speech recognition confidence value of the user speech is less than or equal to the first threshold, the electronic device 100 may determine to transmit the user speech to the server 200. If the speech recognition confidence value of the user speech exceeds the first threshold, the electronic device 100 may obtain the response to the user speech and the dialogue history information associated with the user speech through the second dialogue system. The embodiment associated with the second ASR module will be described in detail with reference to FIG. 3A.

In another embodiment of the disclosure, the electronic device 100 may obtain a language analysis confidence value for the text corresponding to the user speech through the second NLU module of the second dialogue system. The language analysis confidence value indicates a value about a degree of reliability of analyzing and determining a meaning of text corresponding to the user speech.

The electronic device 100 may determine whether to transmit the user speech to the server 200 based on the language analysis confidence value of the user speech 10. For example, based on the language analysis confidence value of the user speech being less than or equal to the second threshold value, the electronic device 100 may determine to transmit the user speech to the server 200. Based on the language analysis confidence value of the user speech exceeding the second threshold value, the electronic device 100 may obtain the response to the user speech and the dialogue history information associated with the user speech through the second dialogue system. An embodiment related to the language analysis confidence value will be described in detail with reference to FIG. 3B.

In another embodiment of the disclosure, the electronic device 100 may obtain a domain of a text corresponding to the user speech and information related to the domain through the second NLU module. The electronic device 100 can determine whether to transmit the user speech 10 to the server 200 based on information related to the obtained domain. An embodiment related to the domain will be described in detail with reference to FIG. 3C.

In another embodiment of the disclosure, the electronic device 100 may determine whether to transmit user speech to the server 200 based on the status information of the electronic device 100. According to one embodiment of the disclosure, the electronic device 100 can determine whether to transmit the user speech to the server 200 based on the current battery charging amount of the electronic device 100, the state of the communication connection with the server, or the like. An embodiment related to the state information of the electronic device 100 will be described in detail with reference to FIG. 3D.

In another embodiment of the disclosure, the electronic device 100 may determine whether to transmit user speech to the server 200 in accordance with a dialogue system selected from a user. In one embodiment of the disclosure, if the dialogue system stored in the server 200 is selected, the electronic device 100 may determine to transmit the user speech to the server 200. An embodiment related to user's selection will be described in detail with reference to FIG. 3E.

If it is determined that the user speech is transmitted to the server 200, the electronic device 100 can transmit at least some of the user speech (or text corresponding to the user speech) and the dialogue history information to the server 200 in operation S220-1. Accordingly, the first dialogue system of the server 200 can use the received dialogue history information to output a response to the user speech and dialogue history information associated with the user speech.

The electronic device 100 may receive dialogue history information for user speech from the server 200 in operation S230-1. The electronic device 100 may receive a response to user speech. The electronic device 100 can store dialogue history information related to the received user speech in operation S240-1, and can provide a response message for the user speech based on the response received from the server 200.

FIG. 2B is a flowchart illustrating a controlling method of a server according to an embodiment of the disclosure.

Referring to FIG. 2B, the server 200 can receive the text corresponding to the user speech to the electronic device 100 and the dialogue history information stored in the electronic device 100 from the electronic device 100 in operation S210-2. In another embodiment of the disclosure, the server 200 may receive user speech input to the electronic device 100 from the electronic device 100 and dialogue history information stored in the electronic device 100. In this case, the server 200 may input the user speech to the first ASR module of the first dialogue system to obtain text corresponding to the user speech.

The server 200 can perform a language analysis on the text through the first dialogue system based on the dialogue history information in operation S220-2. The server 200 may perform a language analysis based on the text and dialogue history information to obtain a first language analysis result and a first language analysis confidence value, and perform a language analysis based only on the text to obtain a second language analysis result and a second language analysis confidence value.

Based on the text corresponding to the user speech received from the current electronic device 100 being a text corresponding to the speech related to the user speech previously input to the electronic device 100, the server 200 can accurately grasp the user's intent than performing the language analysis on the currently received text using the dialogue history information related to the previously input user speech. If the text corresponding to the user speech received from the current electronic device 100 is sound independent of the previously input user speech, the server 200 may ignore the dialogue history information related to the previously input user speech and may perform language analysis based on the text only, so that the user's intent can be accurately recognized. Accordingly, the server 200 can distinguish whether the text corresponding to the user speech input to the electronic device 100 is text corresponding to the speech related to the previous user speech or text corresponding to the independent utterance that is not related to the previous user speech by performing language analysis on the text in a different manner to obtain the first and second language analysis confidence values. The process of performing the language analysis process will be described in detail with reference to FIG. 5.

The server 200 can transmit the result of the performed language analysis to the electronic device 100 in operation S230-2. Specifically, if the first language analysis confidence value exceeds the second language analysis confidence value, the server 200 may transmit the first language analysis result to the electronic device 100.

In another embodiment of the disclosure, if the first language analysis confidence value is less than or equal to the second language analysis confidence value, the server 200 may determine whether to transmit the language analysis result to the electronic device 100 based on information about the domain of the text in the second language analysis result. In one embodiment of the disclosure, if the electronic device 100 may process the domain of text, the server 200 may transmit a second language analysis result to the electronic device 100. As another example, if the electronic device 100 may not process the domain of text, the server 200 may obtain the response to the user speech via the first dialogue system and the dialogue history information associated with the user speech based on the second language analysis result. The server 200 can transmit a response to the obtained user speech and dialogue history information related to the user speech to the electronic device 100.

Figure 3A:
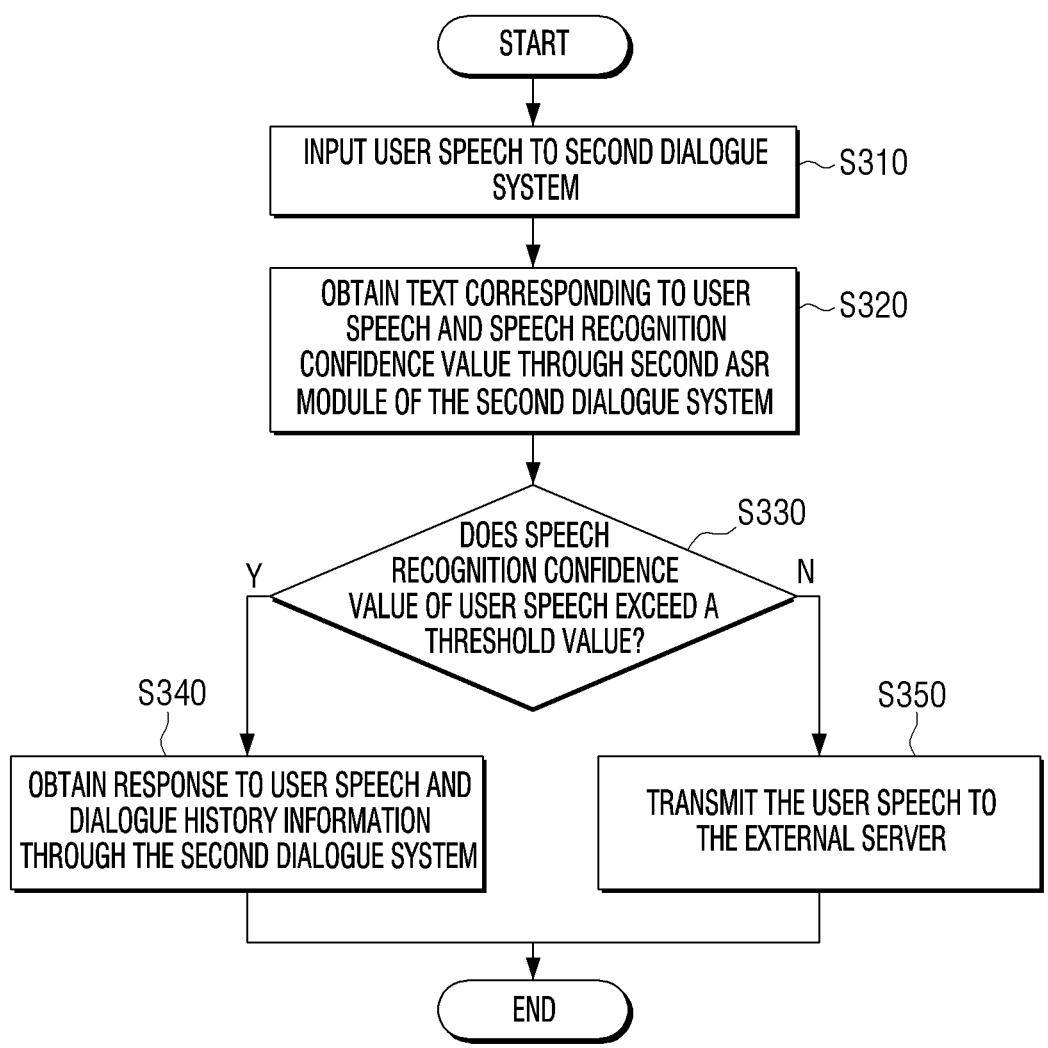
FIGS. 3A, 3B, 3C, 3D, and 3E are flowcharts illustrating a process of determining whether to transmit a user speech to a server by an electronic device according to various embodiments of the disclosure.

FIG. 3A is a diagram illustrating a process of determining whether to transmit a user speech to a server by an electronic device based on a speech recognition confidence value according to an embodiment of the disclosure.

Referring to FIG. 3A, the electronic device 100 can input the input user speech to the second dialogue system in operation S310. The electronic device 100 can obtain text corresponding to the user speech and speech recognition confidence values corresponding to the user speech through the second ASR module of the second dialogue system in operation S320. Specifically, the electronic device 100 can obtain a value about the degree of reliability for recognizing the input user speech and converting the user speech to text through the second ASR module. The speech recognition confidence value can be a value between 0 and 1, and the closer to 1 means that the user speech has been recognized and converted into text with higher confidence.

The electronic device 100 can identify whether the speech recognition confidence value of the user speech exceeds the first threshold value in operation S330. In one embodiment of the disclosure, if a portion of the text corresponding to the user speech includes a text that is not trained by the language model of the second ASR module, the electronic device 100 may identify, through the second ASR module, that the speech recognition confidence value of the user speech to be lower than or equal to the first threshold value. For example, based on a user command "please guide to Seorae Village" being input, if the text "Seorae Village" is not trained by the language model of the second ASR module, the electronic device 100 can identify the speech recognition confidence value of the user speech to be lower than or equal to the first threshold through the second ASR module.

In one embodiment of the disclosure, if it is determined in operation S330 that the speech recognition confidence value of the user speech exceeds the first threshold, the electronic device 100 may obtain dialogue history information and response associated with the user speech through the second dialogue system in operation S340. If the speech recognition confidence value of the user speech is less than or equal to the first threshold value, the electronic device 100 may determine to transmit the user speech to the server 200 in operation S350.

Figure 3B:
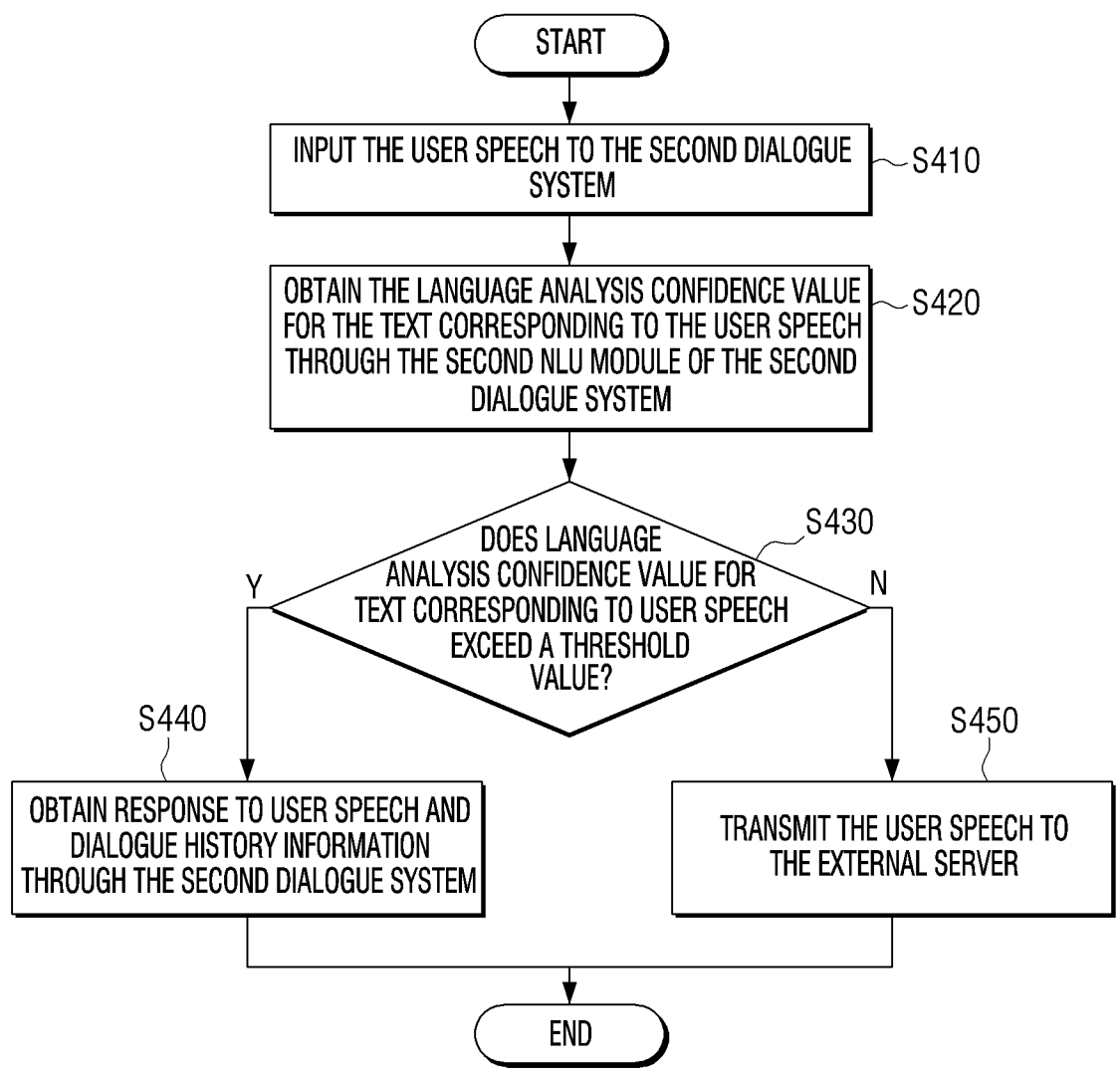

FIG. 3B is a diagram illustrating a process of determining whether to transmit a user speech to a server by an electronic device based on a language analysis confidence value according to an embodiment of the disclosure.

Referring to FIG. 3B, the electronic device 100 can input the input user speech to the second dialogue system in operation S410. The electronic device 100 can obtain a language analysis confidence value for the text corresponding to the user speech through the second NLU model of the second dialogue system in operation S420. The electronic device 100 may obtain a numerical value of the confidence level of the text with which the text corresponding to the user speech is analyzed and understood through the second NLU module. The language analysis confidence value can be a value of 0 or 1, and the closer to 1 means that the text corresponding to the user speech has been analyzed and understood with higher reliability.

The electronic device 100 can identify whether the language analysis confidence value for the text corresponding to the user speech exceeds the second threshold value in operation S430. In one embodiment of the disclosure, if a portion of the text corresponding to the user speech includes an unlearned language, the electronic device 100 may identify the language analysis confidence value of the text corresponding to the user speech through the second NLU module to be less than or equal to the second threshold value.

In one embodiment of the disclosure, if the language analysis confidence value exceeds a second threshold, the electronic device 100 may obtain response and dialogue history information for the user speech via the second dialogue system in operation S440. If the language analysis confidence value is less than or equal to the second threshold, the electronic device 100 may determine to transmit the user speech to the server 200 in operation S450.

Figure 3C:
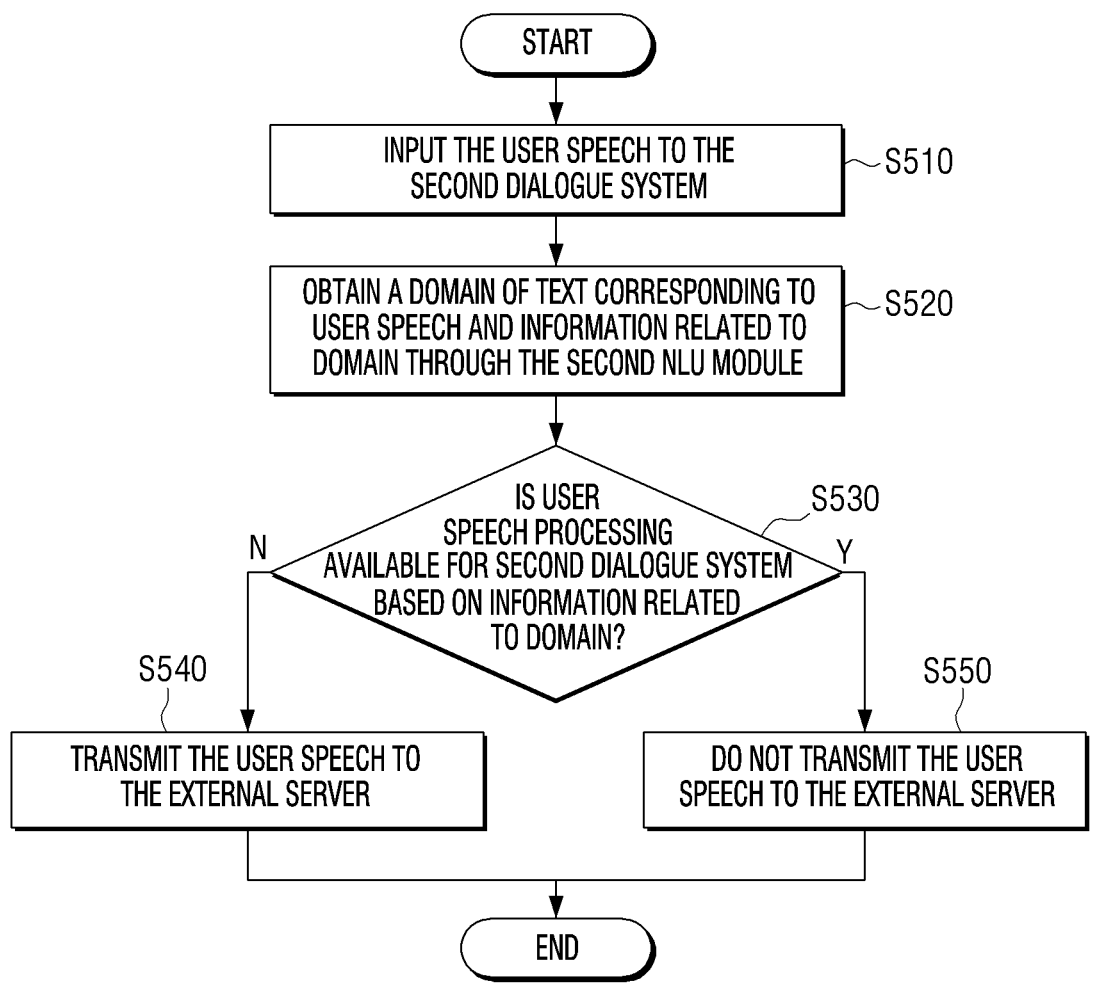

FIG. 3C is a diagram illustrating a process of determining whether to transmit a user speech to a server by an electronic device based on information associated with a domain of the text corresponding to the user speech according to an embodiment of the disclosure.

Referring to FIG. 3C, the electronic device 100 can input the input user speech to the second dialogue system in operation S510. The electronic device 100 can obtain the domain of the text corresponding to the user speech and information related to the domain and through the second NLU module in operation S520. The information associated with the domain may include information related to the information regarding whether the domain is a dedicated domain of the first or second dialogue system, the domain which can be processed by each dialogue system, or information of processing history information for the domain.

According to an embodiment of the disclosure, based on receiving a user speech of "Please let me know the address of "ATSC" academy, the electronic device 100 can obtain information on whether the domain "address (location)" and the "address" are the dedicated domain of the first or second dialogue system through the second NLU module.

The electronic device 100 can identify whether the second dialogue system is capable of processing user speech based on information related to the domain in operation S530. In one embodiment of the disclosure, based on obtaining that the "address" is the domain dedicated to the first dialogue system, the electronic device 100 may identify that the input user speech cannot be processed in the second dialogue system. In another embodiment of the disclosure, based on obtaining the information that the "address" is a domain dedicated to the second dialogue system or the domain that can be processed by both the first dialogue system and the second dialogue system, the electronic device 100 may identify that the input user speech may be processed in the second dialogue system.

If it is identified that the second dialogue system cannot process the user speech based on the information related to the domain, the electronic device 100 can transmit the user speech to the server 200 in operation S540. If it is identified that the second dialogue system is capable of processing user speech based on the information associated with the domain, the electronic device 100 may not transmit the user speech to the server 200 in operation S550 and may obtain dialogue history information and response associated with the user speech through the second dialogue system.

Figure 3D:
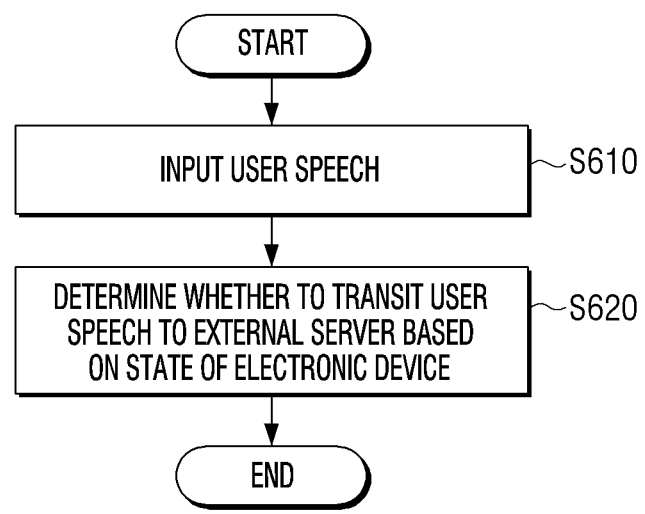

FIG. 3D is a flowchart illustrating a process of determining whether to transmit a user speech to an server by an electronic device based on the status information of an electronic device according to an embodiment of the disclosure.

Referring to FIG. 3D, the electronic device 100 may receive a user speech in operation S610. The electronic device 100 can determine whether to transmit the user speech to the server 200 based on the status information of the electronic device 100 in operation S620.

In one embodiment of the disclosure, the electronic device 100 may determine a dialogue system to input user speech based on a communication connection state with the server 200. For example, if a communication connection with the server 200 is not performed, the electronic device 100 may input the user speech to the second dialogue system without transmitting the user speech to the server 200, and may obtain dialogue history information associated with the user speech and the response to the user speech.

Based on a communication connection being performed with the server 200 while an additional user speech is being entered, the electronic device 100 may determine whether to transmit additional user speech to the second dialogue system to the server. For example, when a communication connection with the server 200 is performed, the electronic device 100 can determine whether to transmit the user speech to the server 200 based on the confidence value and the domain of the user speech obtained in the second dialogue system.

In another embodiment of the disclosure, if the server 200 has transmitted at least some of the user speech and dialogue history information, but has not received dialogue history information associated with the user speech within a threshold time, the electronic device 100 may identify that the communication connection state with the server 200 is not good. The electronic device 100 may determine that the user speech will not be transmitted to the server 200, and may input the user speech to the second dialogue system to obtain dialogue history information associated with the user speech.

In another embodiment of the disclosure, the electronic device 100 may determine whether to transmit user speech to the server 200 based on a battery charging status of the electronic device 100. If the battery charge amount of the electronic device 100 is less than or equal to a threshold value, the electronic device 100 may determine that the user speech is not transmitted to the server 200 in order to reduce battery consumption. The electronic device 100 can input the user speech to the second dialogue system to obtain dialogue history information related to the user speech.

Figure 3E:
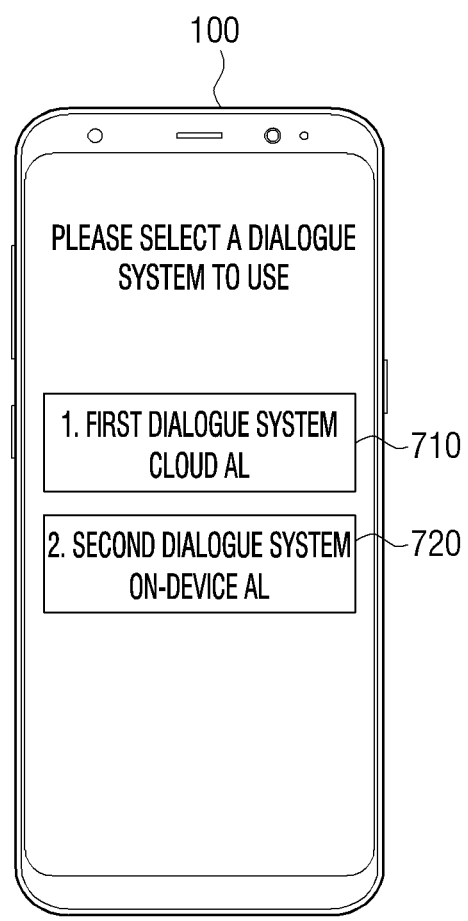

FIG. 3E is a diagram illustrating a process of selecting a dialogue system for providing a response to the user speech by the electronic device 100 according to an embodiment of the disclosure.

Referring to FIG. 3E, when a dialogue system to provide a response to user speech is selected, the electronic device 100 may determine the dialogue system to provide a response to the user speech as a selected dialogue system. In FIG. 3E, the electronic device 100 is implemented as a smartphone and the inputter 170 is implemented as a touch screen, but this is only one embodiment. The electronic device 100 may receive a user command for selecting a dialogue system that will provide a response to the user speech through the variously implemented inputter 170.

In one embodiment of the disclosure, as shown in FIG. 3E, the electronic device 100 may display a user interface (UI) for selecting a dialogue system that will provide a response to the user speech. When a UI 710 representing the first dialogue system stored in the server 200 is selected through the touch screen, the electronic device 100 may transmit the user speech to the server 200. If a UI 720 representing the second dialogue system embedded in the electronic device 100 is selected from the user through the touch screen, the electronic device 100 may input the user speech into the second dialogue system to obtain a response to the user speech and dialogue history information associated with the user speech.

Figure 4A:
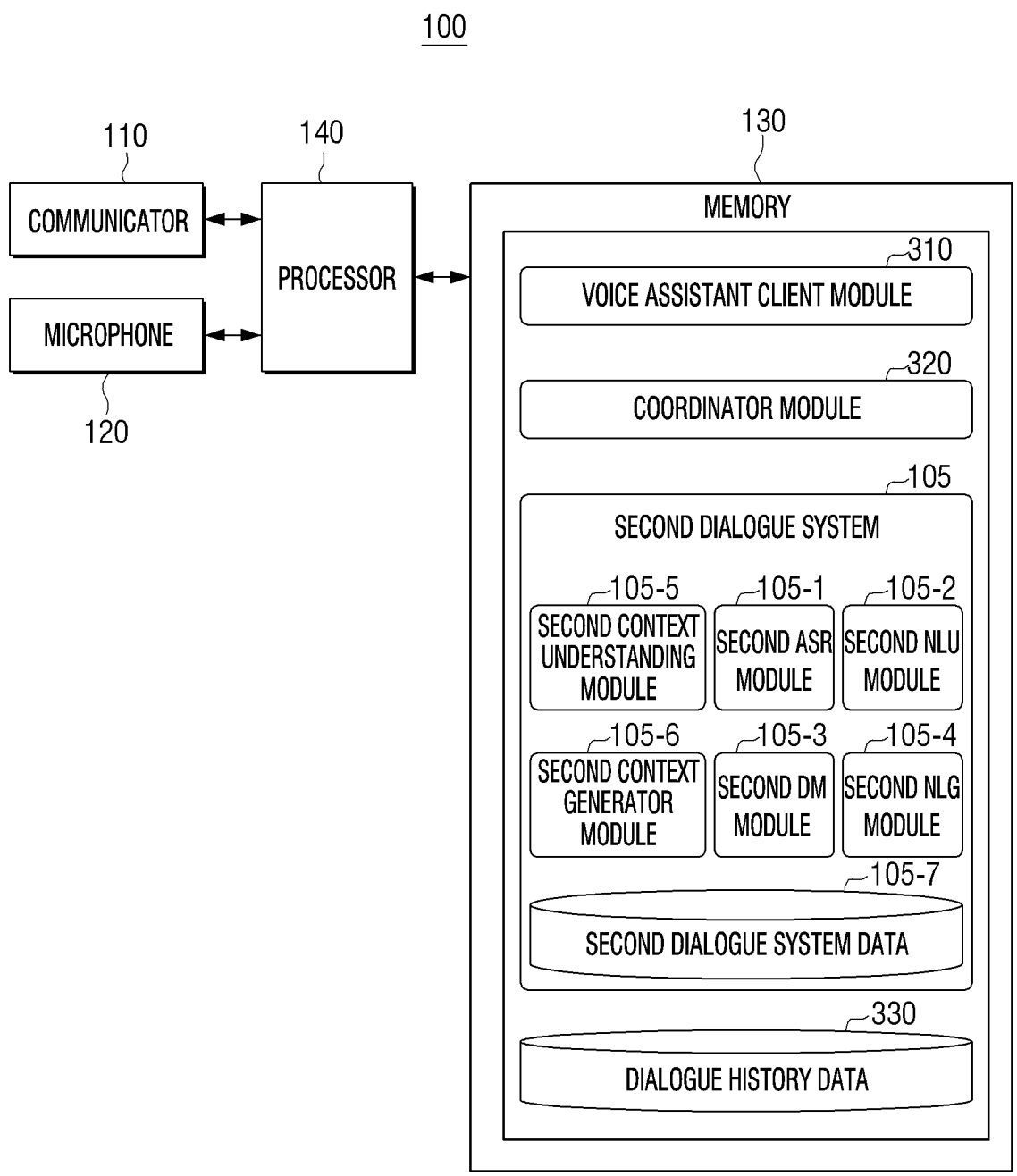
FIG. 4A is a diagram briefly illustrating a configuration of an electronic device according to an embodiment of the disclosure.

FIG. 4A is a block diagram schematically illustrating a configuration of an electronic device according to an embodiment of the disclosure.

Referring to FIG. 4A, the electronic device 100 may include a communicator 110, a microphone 120, a memory 130, and a processor 140. The configuration shown in FIG. 4A is an example for implementing embodiments of the disclosure, and hardware and software configurations that would be obvious to a person skilled in the art may be further included in the electronic device 100.

The communicator 110 can communicate with an external device through various communication methods. Communication of the communicator 110 with an external device may include communicating through a third device (e.g., a repeater, hub, access point, server or gateway, and the like)

The communicator 110 may include various communication modules to communicate with an external device. For example, the communicator 110 may include a cellular communication module which uses at least one of long-term evolution (LTE), LTE advanced (LTE-A), 5th generation (5G), a code division multiple access (CDMA), a wideband CDMA (WCDMA), and a universal mobile telecommunications system (UMTS), a wireless broadband (WiBro), or a global system for mobile communications (GSM) and the like. According to embodiments of the disclosure, the wireless communication may include, for example, any one or any combination of wireless fidelity (Wi-Fi), Bluetooth, Bluetooth low energy (BLE), Zigbee, or the like.

The microphone 120 is a configuration for receiving user speech and can be provided inside the electronic device 100, but it is only one embodiment of the disclosure, and can be provided outside the electronic device 100 to be electrically connected to the electronic device 100 or to be communicatively connected to the electronic device 100 through the communicator 110.

The memory 130 may store instructions or data related to at least one other component of the electronic device 100. An instruction is one action statement for the electronic device 100 in a programming language and is the minimum unit of program that the electronic device 100 can perform directly. In an embodiment of the disclosure, the memory 130 may be implemented as a non-volatile memory, a volatile memory, a flash memory, a hard disk drive (HDD), a solid state drive (SSD), or the like. The memory 130 is accessed by the processor 140 and reading/writing/modifying/deleting/updating of data by the processor 140 may be performed.

In the disclosure, the term memory may include the memory 130, read-only memory (ROM) in the processor 140, RAM, or a memory card (for example, a micro SD card, and a memory stick) mounted to the electronic device 100. In addition, the memory 130 may store programs and data for configuring various screens to be displayed in the display area of the display.

The memory 130 may store a program for executing a second dialogue system. The second dialogue system is a personalized program for providing various services to the electronic device 100. The memory 130 may store a program and dialogue history information associated with the second dialogue system to obtain dialogue history information associated with the second dialogue system. The memory 130 may store program and dialogue history information associated with the first dialogue system to obtain dialogue history information associated with the first dialogue system from the server 200. In one embodiment of the disclosure, the memory 130 may store dialogue history information while the second dialogue system is being executed, and the dialogue history information stored in the memory 130 may be deleted when performance of the second dialogue system ends.

As shown in FIG. 4A, various software modules may be stored in the memory 130. Each software module may be controlled by the processor 140. Specifically, each software module stored in the memory 130 may be loaded into volatile memory (e.g., dynamic random-access memory (DRAM) and static RAM (SRAM), and the like) by the control of the processor 140. Although the volatile memory may be implemented as a separate component that may be associated with the processor 140, it is only one embodiment and the volatile memory may be implemented in the form of a component included in the processor 140 as one component of the processor 140. The volatile memory may refer to a memory which requires a continuous power supply to maintain stored information.

A speech assistant client module 310 can record and store in a first storage region of the volatile memory such that other software modules can process user speech input through the microphone 120 by the control of the processor 140. In describing the disclosure, the first to fifth storage regions of the volatile memory are for describing a process of accessing a storage region in which specific data is stored in a volatile memory for processing specific data, wherein each storage region can be a separate storage region, but it is only one embodiment of the disclosure, and some storage regions can be implemented in a form that is included as a component of another storage region.

A coordinator module 320 may access a second storage region of the volatile memory to determine whether to transmit at least one of the user speech or the text corresponding to the user speech to the server 200 based on the speech recognition confidence value and the language analysis confidence value of the user speech recorded and stored in the second storage region. As another example, the coordinator module 320 may access a third storage region of the volatile memory to determine whether to transmit at least one of text or user speech corresponding to the user speech to the server 200 based on the domain of the text corresponding to the user speech, the language analysis confidence value, and the process of determining whether to transmit the at least one of the text or the user speech to the server 200 will be described in detail with reference to the operation of the processor 140.

The second ASR module 105-1 may access the first storage region of the volatile memory, perform speech recognition on the user speech recorded and stored in the first storage region, and output text corresponding to the recognized user speech. The second ASR module 105-1 can calculate a speech recognition confidence value for each user speech. The speech recognition confidence value is a value indicating with which level of confidence the second ASR module 105-1 recognizes the input user speech and texts the user speech into text. The higher the speech recognition confidence value may mean that the second ASR module 105-1 more securely recognizes the user speech and converts the user speech to text corresponding to the user speech. The text and speech recognition confidence values corresponding to the user speech output by the second ASR module 105-1 can be recorded and stored in the second storage region of the volatile memory by the processor 140.

In one embodiment of the disclosure, when a portion of the text corresponding to the user speech is not learned by the language model (not shown) of the second ASR module 105-1, the second ASR module 105-1 may calculate the speech recognition confidence value to be lower than or equal to the first threshold value. For example, if the user speech "please let me know the telephone number of the CDE Building in the Seorae Village" is input through the microphone 120, if the text corresponding to the user speech includes the "CDE Building" which is not learned by the language model of the second ARM module 105-1, the second ASR module 105-1 may calculate the speech recognition confidence value for the input user speech to be lower than or equal to the first threshold value.

A second natural language understanding (NLU) module 105-2 may access a second storage region of the volatile memory to determine the user's intent and parameters using a matching rule that is divided into a domain, an intent, and a parameter (or slot) necessary to grasp the intent based on text corresponding to user speech recorded and stored in a second storage region. Specifically, one domain (e.g., an alarm) may include a plurality of intents (e.g., an alarm setting, an alarm release), and one intent may include a plurality of parameters (e.g., time, number of iterations, alert, or the like). The matching rule may be stored in an NLU database (not shown). The second NLU module 105-2 can determine the user's intent by gasping the meaning of a word extracted from the user input using a linguistic characteristic, such as a morpheme, a phrase, and the like, (e.g., a grammatical element), and matching the grasped meaning of the word to the domain and the intent. The language analysis confidence value output by the second NLU module 105-2 and the domain, intent, parameter, or the like, of the text corresponding to the user speech can be recorded and stored in the third storage region of the volatile memory by the control of the processor 140.

For example, if the user speech converted to the text through the second ASR module 105-2 is "please guide a route to Seorae Village", the second NLU module 105-2 can obtain an intent that the user requests the route guide to the location named "Seorae Village" by grasping the meaning of a word, such as "Seorae Village", "road guide," or the like.

The second NLU module 105-2 can calculate a language analysis confidence value for the text corresponding to the user speech obtained through the second ASR module. The language analysis confidence value is a numerical value about with which confidence value, the second NLU module 105-2 analyzes and grasps the text corresponding to the user speech. The higher the language analysis confidence value may mean that the second NLU module 105-2 more reliably analyzes the text corresponding to the user speech and grasps the user's intent.

A second dialogue manager (DM) module 105-3 may access a third storage region of the volatile memory to determine whether the information about the user's intent recorded and stored in the third storage region is clear. The second DM module 105-3 may identify whether the user's intent is clear based on whether the information of the parameter is sufficient. The second DM module 105-3 may generate a result (or a response) of performing a task corresponding to the user input when an operation based on the intent grasped through the second NLU module 105-2 and the parameter can be performed. The result and response corresponding to the user input from the second DM module 105-3 may be stored in the fourth storage region of the volatile memory by the processor 140.

For example, if the second NLU module 105-2 grasps a user intent that requires route guide to the location named "Seorae Village", the second DM module 105-3 may generate a response in the sense that the second NLU module 105-3 will start a route guide to the Seorae Village. As another example, the second DM module 105-3 may identify whether the intent of the user identified by the first NLU module 205-2 of the server 200 is clear based on a language analysis result of the text corresponding to the user speech received from the server 200 and stored in the volatile memory. Since the identifying process has been described above, a detailed description thereof will be omitted.

A second natural language generator (NLG) module 105-4 may access a fourth storage region of the volatile memory to change the response to the user speech recorded and stored in the fourth storage region in a text form. The information changed in the text form may be in the form of natural language utterances. For example, the second NLG module 105-4 may output the text "let me start a route guide to the Seorae Village" based on a response of the meaning of starting a route guide to the Seorae Village recorded and stored in the volatile memory. The text output by the second NLG module 105-4 may be recorded and stored in the fifth storage region of the volatile memory by the control of the processor 140. The response to the user speech changed in the form of text can be displayed on the electronic device 100. As another example, a text to speech synthesis (TTS) module (not shown) may access the fifth storage region of the volatile memory to change and output the text recorded and stored in the fifth storage region in the form of a speech.

A second dialogue system data 105-7 may store learning data to train a software module included in the second dialogue system 105.

The second context understanding module (or the second dialogue history information understanding unit) 105-5 can identify information on the task that the electronic device 100 has performed before the user speech is input, dialog context information included in the user speech, and state information of the electronic device 100 at the time when the user speech is input, based on the input user speech. For example, if the user speech is "please guide a route to Seorae Village", then the second context understanding module 105-5 can identify information about the situation information that requires road guide to the location named "Seorae Village", and information on whether an application capable of providing a route guide service is installed on the electronic device 100, based on the user speech.

The second context generator module (or a second dialogue history information generator) 105-6 may generate dialogue history information based on the information recorded and stored in the volatile memory and may store the generated dialogue history information in the dialogue history data 330. The dialogue history data 330 may be a database in which the dialogue history information is classified with a predetermined condition (e.g., an order of storage, or the like).

The processor 140 may be electrically connected to the memory 130 to control the overall operation and functionality of the electronic device 100. The processor 140 may determine whether to transmit the user speech input through the microphone 120 to server 200 by executing instructions of a program to execute the second dialogue system stored in the memory 130. The processor 140 may input the user speech into the second dialogue system to obtain a confidence value or domain of the user speech and may determine whether to transmit the user speech to the server 200 based on the obtained confidence value or domain of the user speech.

In one embodiment of the disclosure, the processor 140 may obtain a speech recognition confidence value of text and user speech corresponding to the user speech through the second ASR module of the second dialogue system, and may determine whether to transmit the user speech to the server 200 based on the speech confidence value. Specifically, the processor 140 may determine whether to transmit the user speech to the server 200 depending on whether the speech recognition confidence value of the user speech obtained through the second ASR module exceeds the first threshold value.

In another embodiment of the disclosure, the processor 140 may obtain a language analysis confidence value of the text corresponding to the user speech through the second NLU module of the second dialogue system and determine whether to transmit the user speech to the server 200 based on the language analysis confidence value. The processor 140 may determine whether to transmit the user speech to the server 200 depending on whether the language analysis confidence value of the text corresponding to the user speech obtained through the second NLU module exceeds the second threshold value.

In another embodiment of the disclosure, the processor 140 may obtain the domain of the text corresponding to the user speech and information related to the domain through the second NLU module. The processor 140 may determine whether to transmit the user speech to the server 200 based on the information associated with the domain. In one embodiment of the disclosure, based on obtaining the information that the domain of the text corresponding to the user speech may not be processed in the second dialogue system through the second NLU module, the processor 140 may determine to transmit the user speech to the server 200.

In another embodiment of the disclosure, the processor 140 may determine whether to transmit the user speech to the server 200 based on the state of the electronic device 100. In one embodiment of the disclosure, the processor can determine whether to transmit the user speech to the server 200 based on communication connection state between the electronic device 100 and the server 200 or the battery charging state of the electronic device 100, or the like.

In another embodiment of the disclosure, the processor 140 may determine whether to transmit the user speech to the server 200 in accordance with a dialogue system that will provide a response to the selected user speech through the inputter 170. For example, if the first dialogue system is selected as a dialogue system to provide a response to the user speech through the inputter 170, the processor 140 may determine to transmit all input user speech to the server 200.

In an embodiment of the disclosure, if it is determined that the user speech is transmitted to the server 200, the processor 140 may control the communicator 110 to transmit at least a portion of the stored dialogue history information to the server 200 including the first dialogue system. The processor 140 may receive a response to the user speech and dialogue history information related to the user speech from the server 200 through the communicator 110, and may store the received dialogue history information in the memory 130. The processor 140 may perform an operation corresponding to a response to the received user speech, or may output a response message corresponding to the received response. For example, the processor 140 may control a display 150 to display a UI corresponding to a response to the user speech, or execute an application corresponding to the response. The processor 140 may output a response message corresponding to the response to the user speech in a form of a speech, or may display the response message in the form of text.

In one embodiment of the disclosure, if additional user speech is input through the microphone 120, the processor 140 may input additional user speech into the second dialogue system to determine whether to transmit the user speech to the server 200. If it is determined that no additional user speech is to be transmitted to the server 200, the processor 140 may use the dialogue history information associated with the user speech of the dialogue history information pre-stored in the second dialogue system to analyze the additional user speech recognition or language and obtain dialogue history information associated with the additional user speech and the response to the additional user speech.

A function related to artificial intelligence may operate according to the processor 140 and the memory 130.

The processor 140 may include one or a plurality of processors. The one or a plurality of processors 140 may be a general-purpose processor, such as a central processing unit (CPU), an application processor (AP), a graphics-only processor, such as a graphics processor (GPU), a vision processing unit (VPU), an AI-only processor, such as a neural network processor (NPU), or the like.

The one or a plurality of processors 140 may control processing of the input data according to a predefined operating rule or AI model stored in the memory 130. The predefined operating rule or learning network model may be made by learning.

Here, being made through learning may mean that, by applying learning algorithm to a plurality of learning data, a learning network model of a desired characteristic is (or purpose) made. The learning network model may be including a plurality of neural network layers. Each layer may have a plurality of weight values, and may perform a calculation of a layer through calculation of a plurality of weight values and a calculation result of a previous layer.

The AI model may include a plurality of neural network layers. Each layer may have a plurality of weight values, and may perform a calculation of a layer through calculation of a plurality of weight values and a calculation result of a previous layer. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN) and deep Q-Networks, and the neural network is not limited to the above-described example except when specified.

The language understanding is a technology of recognizing and applying/processing a human language/character, including natural language processing, machine translation, dialogue system, question answering, speech recognition/synthesis, and the like.

The learning algorithm is a method for training a predetermined target device (e.g., a robot) using a plurality of learning data to cause the device to make a determination or prediction by itself. Examples of learning algorithms include supervised learning, unsupervised learning, semi-supervised learning, or reinforcement learning, and the learning algorithm in the disclosure is not limited to the examples described above except when specified.

Figure 4B:
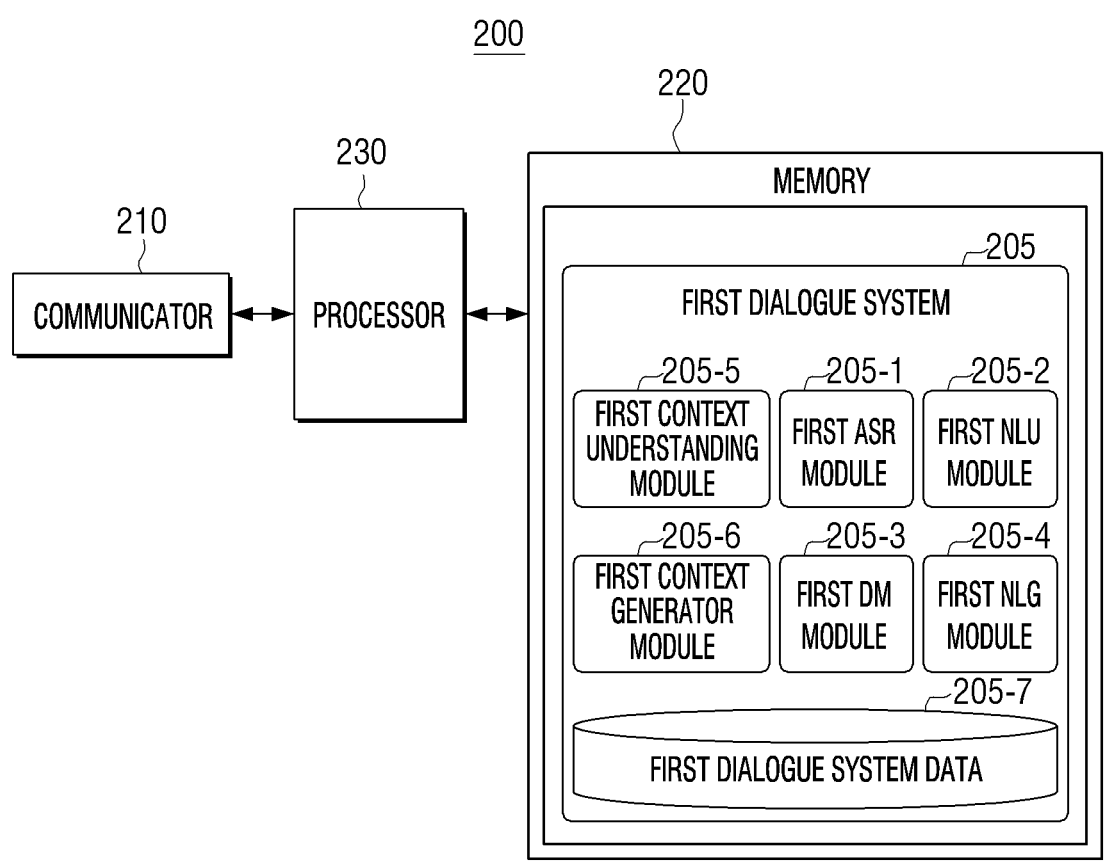
FIG. 4B is a diagram briefly illustrating a configuration of a server according to an embodiment of the disclosure.

FIG. 4B is a block diagram schematically illustrating a configuration of a server according to an embodiment of the disclosure.

Referring to FIG. 4B, a server 200 may include a communicator 210, a memory 220, and a processor 230. The configuration shown in FIG. 4B is an example for implementing embodiments of the disclosure, and appropriate hardware and software configurations that would be obvious to a person skilled in the art may be further included in the server 200.

The communicator 210 may communicate with an external device (e.g., the electronic device 100) through various communication methods. Communicatively connecting the communicator 210 with the external device may include communication via a third device (e.g., a relay, a hub, an access point, a gateway, or the like).

The communicator 210 may include various communication modules to communicate with the external device. The communication module has been described with reference to FIG. 4A and will not be further described.

The memory 220 may be implemented as a non-volatile memory, a volatile memory, a flash-memory, a hard disk drive (HDD), slid state drive (SSD), or the like. The memory 220 may be accessed by the processor 140, and may perform reading, recording, modifying, deleting, updating, or the like, of data by the processor 140. The term memory may refer to the memory 220, the read only memory (ROM), random access memory (RAM) in the processor 140, or a memory card (for example, micro secure digital (SD) card, a memory stick) mounted in the server 200. In the memory 220, program, data, or the like, for configuring various screens to be displayed in a display area of the display 150 may be stored.

The memory 220 may store the first dialogue system and at least one instruction.

The memory 220 may store a program for executing the first dialogue system. The first dialogue system is a personalized program for providing various services to the user. The memory 220 may store a program for obtaining dialogue history information associated with the first dialogue system and dialogue history information associated with the first dialogue system. The memory 220 may store a program and dialogue history information associated with the second dialogue system to obtain dialogue history information associated with the second dialogue system from the electronic device 100. In one embodiment of the disclosure, the memory 220 may store dialogue history information while the first dialogue system is being executed, and the dialogue history information stored in the memory 220 may be deleted when performance of the first dialogue system ends.

The memory 220 may store the first dialogue system 205 including various software modules, as shown in FIG. 4B. Each software module may be controlled by the processor 230.

The first ASR module 205-1, the first NLU module 205-2, the first DM module 205-3, the first NLG module 205-4, the first context understanding (or first dialogue history information understanding unit) 205-5, the first context generator (or the first dialogue history information generator) 205-6, and the first dialogue system data 205-7 of the first dialogue system 205 stored in the server 200 may perform a same function as modules respectively corresponding to a second dialogue system 105.

The amount of data stored in the language model of the first ASR module 205-1 included in the first dialogue system 205 can be larger compared to the amount of data stored in the language model included in the second ASR module 105-1. The amount of data that can be processed of the first dialogue system 205 can be larger as compared to the second dialogue system.

According to one embodiment of the disclosure, the first NLU module 205-2 included in the first dialogue system 205 may perform language analysis based on the dialogue history information of the text corresponding to the user speech input to the electronic device 100 received from the electronic device 100. The first NLU module 205-2 may perform language analysis based on the dialogue history information to output a first language analysis result and a first language analysis confidence value, and perform language analysis based only on the text to output a second language analysis result and a second language analysis confidence value. The language analysis confidence value and the language analysis result output from the first NLU module 205-2 can be recorded and stored in the volatile memory by the control of the processor 230.

In one embodiment of the disclosure, the first NLU module 205-2 can identify a domain and an intent of text corresponding to the user speech through the dialogue history information. When the text corresponding to the user speech input to the electronic device 100 is "Seorae Village" and the context information requiring route guide by the user is included in the dialogue history information received from the electronic device 100, the first NLU module 205-2 may grasp, through the dialogue history information, that the domain of text is "Location" related to route guide, and the intent is requesting a route guide to the destination of "Seorae Village." Therefore, when the language analysis is performed on the text using the dialogue history information, the first NLU module 205-2 can omit the domain classification and grasping the intent of the text. The first NLU module 205-2 may output a first language analysis result, and output a first language analysis confidence value which is a numeral value as to whether the text corresponding to the user speech has been analyzed and understood with which level of confidence.

While the first NLU module 205-2 performs language analysis for the text based on the dialogue history information, the language analysis can be performed with a text only. For example, the first NLU module 205-2 can classify a domain of the text without utilizing the dialogue history information and may perform an operation of grasping the intent to output a second language analysis result and a second language analysis confidence value. In the above embodiment of the disclosure, the first language analysis confidence value may be higher than the second language analysis confidence value because the text and dialogue history information corresponding to the user speech are associated.

In another embodiment of the disclosure, the first NLU module 205-2 may perform a language analysis based only on text to output a second language analysis result and a second language analysis confidence value. For example, if the text corresponding to the user speech is "please let me know the weather of Beijing, instead of that" and dialogue history information is the situation information that the current user requests the road guide, the first NLU module 205-2 may ignore the dialogue history information and perform language analysis on the text so that the domain of the text is "weather" related weather and the intent is to request weather of the location named "Beijing". The first NLU module 205-2 can output a second language analysis confidence value that is a value regarding with which degree of confidence, the text has been analyzed and understood.

The first NLU module 205-2 can perform a language analysis on the text based on the dialogue history information while performing the language analysis based on the text only, to output the first language analysis confidence value and the first language analysis result. The first NLU module 205-2 can grasp that the domain that can be identified through the dialogue history information is "location". However, since the domain of the text corresponding to the user speech is "weather" and is an utterance independent of the user speech corresponding to the dialogue history information, the second language analysis confidence value can be higher than the first language analysis confidence value.

The processor 230 may be electrically connected to the memory 220 to control the overall operation and functionality of the server 200. The processor 230 may execute instructions of a program to execute a first dialogue system stored in the memory 220. The processor 230 may receive text corresponding to user speech input to the electronic device 100 from the electronic device 100 through the communicator 210 and dialogue history information stored in the electronic device 100. However, this is only one embodiment of the disclosure, and the processor 230 may receive user speech input to the electronic device 100 through the communicator 210. The processor 230 may obtain text corresponding to the user speech through the first dialogue system.

The processor 230 may perform a language analysis on the text through the first dialogue system based on the dialogue history information. The processor 230 may perform a language analysis based on the text and dialogue history information to obtain a first language analysis result and a first language analysis confidence value, and perform language analysis on the text only to obtain a second language analysis result and a second language analysis confidence value. The processor 230 can identify whether the text corresponding to the user speech input to the electronic device 100 is text corresponding to the speech related to the previous user speech or text corresponding to the independent utterance not related to the previous user speech by performing language analysis on the text in a different manner to obtain the first and second language analysis results.

The processor 230 may transmit one of the first language analysis result and the second language analysis result to the electronic device 100 based on the first language analysis confidence value and the second language analysis confidence value. In one embodiment of the disclosure, if the first language analysis confidence value is higher than the second language analysis confidence value, the processor 230 may control the communicator 210 to transmit the first language analysis result to the electronic device 100. In another embodiment of the disclosure, if the second language analysis confidence value is higher than the first language analysis confidence value, the processor 230 may determine whether to transmit the text to the electronic device 100 based on information related to the domain of the text in the second language analysis result.

In one embodiment of the disclosure, the processor 230 may identify whether the domain of the text is a domain which can be processed by the electronic device 100. For example, if the domain of text is a domain that can be processed using data stored in the memory 220, the processor 230 may identify that the domain of text is a domain that the electronic device 100 cannot process. As another example, if the domain of the text is a domain that can be processed using data stored in the electronic device 100, the processor 230 may identify the domain of text as the domain which can be processed by the electronic device 100. As another example, a domain which the electronic device 100 can process or a domain which the server 200 can process can be determined by the user's input.

In one embodiment of the disclosure, if the domain of text is identified to be capable of being processing the electronic device 100, the processor 230 may control the communicator 210 to transmit the second language analysis result to the electronic device 100. As another example, if it is identified that the domain of text cannot be processed by the electronic device 100, the processor 230 may obtain the response to the user speech and the dialogue history information associated with the user speech based on the second language analysis result. The processor 230 may control the communicator 210 to transmit the obtained response and dialogue history information associated with the user speech to the electronic device 100.

The functionality associated with artificial intelligence can operate through the processor 230 and the memory 220. The functionality associated with the artificial intelligence (for example, learning process) has been described above and will not be further described.

FIG. 5 is a flowchart illustrating a controlling method of a server according to an embodiment of the disclosure.

Referring to FIG. 5, in one embodiment of the disclosure, the server 200 may receive text corresponding to user speech input to the electronic device 100 from the electronic device 100 and dialogue history information stored in the electronic device 100 in operation S710. In one embodiment of the disclosure, when user speech is input from the electronic device 100, the server 200 may obtain text corresponding to the user speech through the first ASR module of the first dialogue system.

The server 200 may perform a language analysis based on the text and dialogue history information to obtain a first language analysis result and a first language analysis confidence value and perform a language analysis based on the text only to obtain a second language analysis result and a second language analysis confidence value in operation S720. Specifically, the server 200 can obtain the first language analysis result and the first language analysis confidence value by performing a language analysis on the text using information on the domain and the intent of the text corresponding to the user speech included in the dialogue history information. For example, when the server 200 performs language analysis on the text, the process of classifying the domain and the intent of the additional text can be omitted. In yet another example, the server 200 may perform a language analysis process that classifies the domain and intent of the text itself without using dialogue history information to obtain a second language analysis result and a second language analysis confidence value.

The server 200 can identify whether the first language analysis confidence value is higher than the second language analysis confidence value in operation S730. For example, the server 200 can compare the first and second language analysis confidence values to identify whether the text corresponding to the user speech input to the electronic device 100 is text corresponding to the speech associated with the user input to the electronic device 100 or text corresponding to the independent utterance.

If the first language analysis confidence value is higher than the second language analysis confidence value, the server 200 can transmit the first language analysis result to the electronic device in operation S730-Y. That is, if the text corresponding to the user speech input to the current electronic device 100 is identified as text related to the user speech input to the electronic device 100, the server 200 can transmit the first language analysis result to the electronic device 100. If the first language analysis confidence value is lower than the second language analysis confidence value, the server 200 may identify whether the domain of the text can be processed in the electronic device 100 in operation S730-N.

If it is identified that the domain can be processed by the electronic device 100, the server 200 may transmit a second language analysis result to the electronic device in operation S740. If it is identified that the domain of the text is not processed in the electronic device 100, the server 200 can obtain the response to the user speech and the dialogue history information related to the user speech based on the second language analysis result through the first dialogue system in operation S750. The server 200 can transmit a response to the user speech and dialogue history information to the electronic device 100 in operation S760.

Figure 6A:
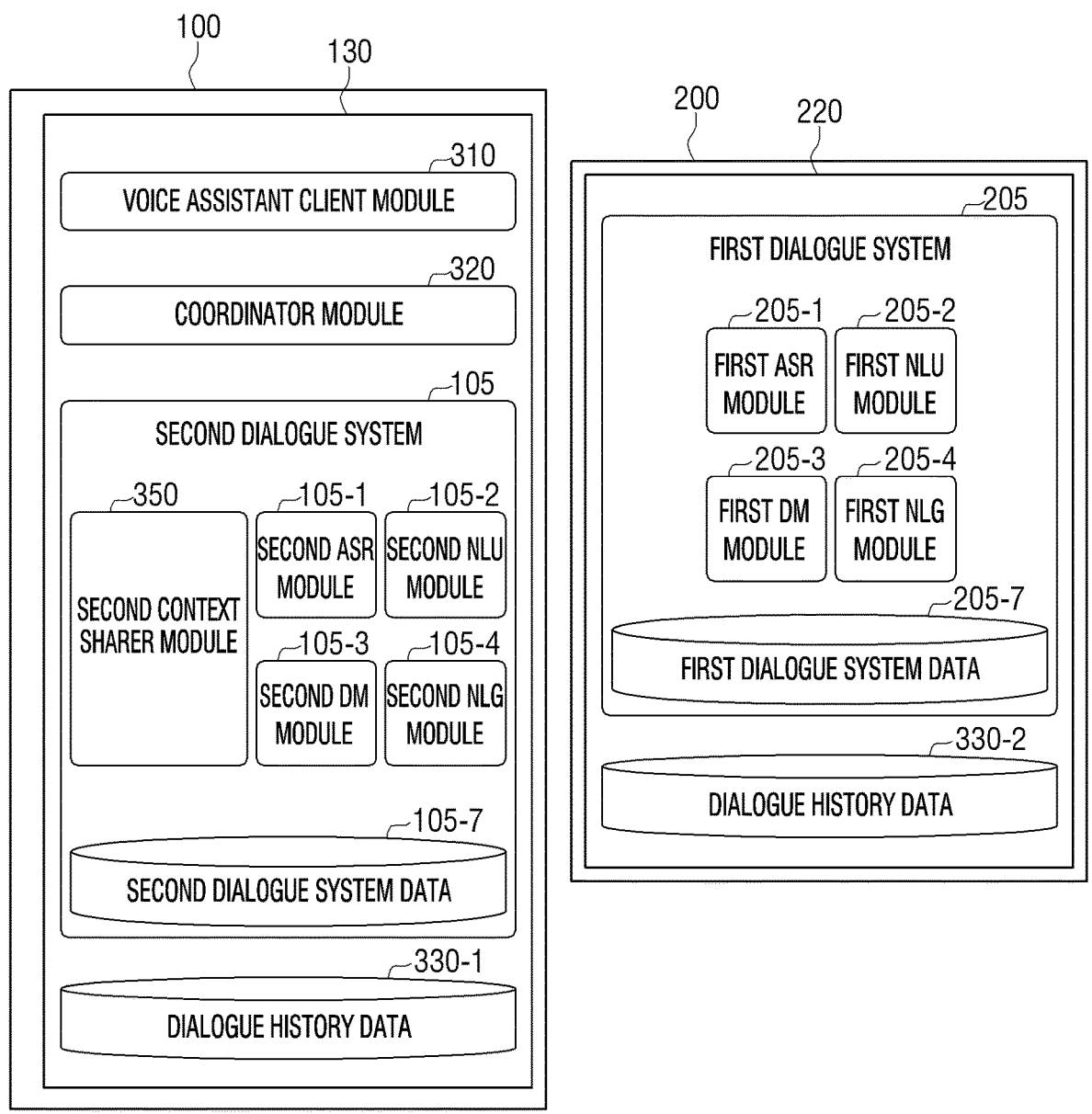
FIGS. 6A and 6B are diagrams illustrating an operation between a software module of an electronic device and a software module of a server according to various embodiments of the disclosure.
Figure 6B:
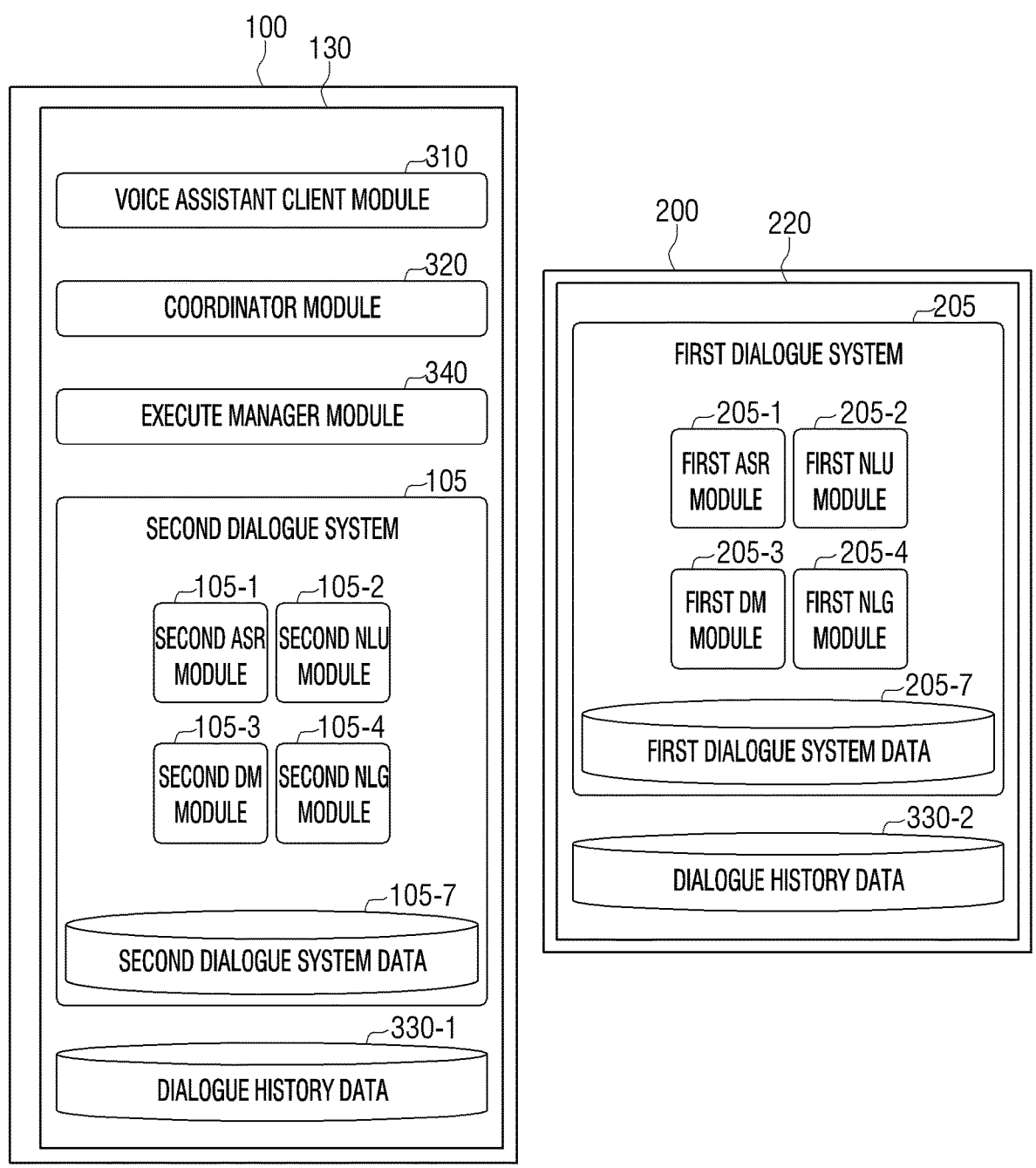

FIGS. 6A and 6B are diagrams illustrating operations between software modules of a dialogue system included in an electronic device and a server according to various embodiments of the disclosure.

Referring to FIGS. 6A and 6B, that is, unlike FIGS. 4A and 4B, each of the electronic device 100 and the server 200 may store software modules in the memories 130 and 220, as shown in FIGS. 6A and 6B. Meanwhile, the overlapping with FIGS. 4A and 4B will be omitted.

The second context sharer module (or the second dialogue history information sharing module) of the second dialogue system 105 may share dialogue history information with the first dialogue system 205. In one embodiment of the disclosure, the second context sharer module 350 may output a signal requesting to transmit a signal requesting the dialogue history information (or data) 330-2 stored in the server 200 to the server 200. The processor 140 can control the communicator 110 to transmit a signal requesting the dialogue history information 330-2 to the server 200. The processor 140 may receive the dialogue history information 330-2 from the server 200 through the communicator 110.

The processor 140 may receive, through the communicator 110, a signal requesting the sharing of dialogue history information from the server 200. When the processor 140 receives a signal requesting the dialogue history information through the communicator 110, the second context sharer module 350 may output a signal requesting to transmit the dialogue history information (or data) 330-1 to the server 200. The processor 140 can control the communicator 110 to transmit the dialogue history information to the server 200 based on the output signal.

In another embodiment of the disclosure, the software module of the dialogue system included in the electronic device 100 and the server 200 may be implemented as shown in FIG. 6B. Meanwhile, the overlapping description with FIGS. 4A and 4B will be omitted.

The execute manager module (or execution manager module) 340 of the second dialogue system 105 may control to perform a function corresponding to the response to the user speech obtained in the first dialogue system 205 or the second dialogue system that is recorded and stored in the volatile memory. For example, upon receiving a response to the user speech, "please guide a route to Seorae Village", the execute manager module 340 may control to execute a navigation application that guides the route to the Seorae Village.

In one embodiment of the disclosure, upon receiving a response to the user speech from the first dialogue system 205 through the communicator 110, the execute manager module 340 may transmit the cache information of the response to the second dialogue system 206.

Figure 7:
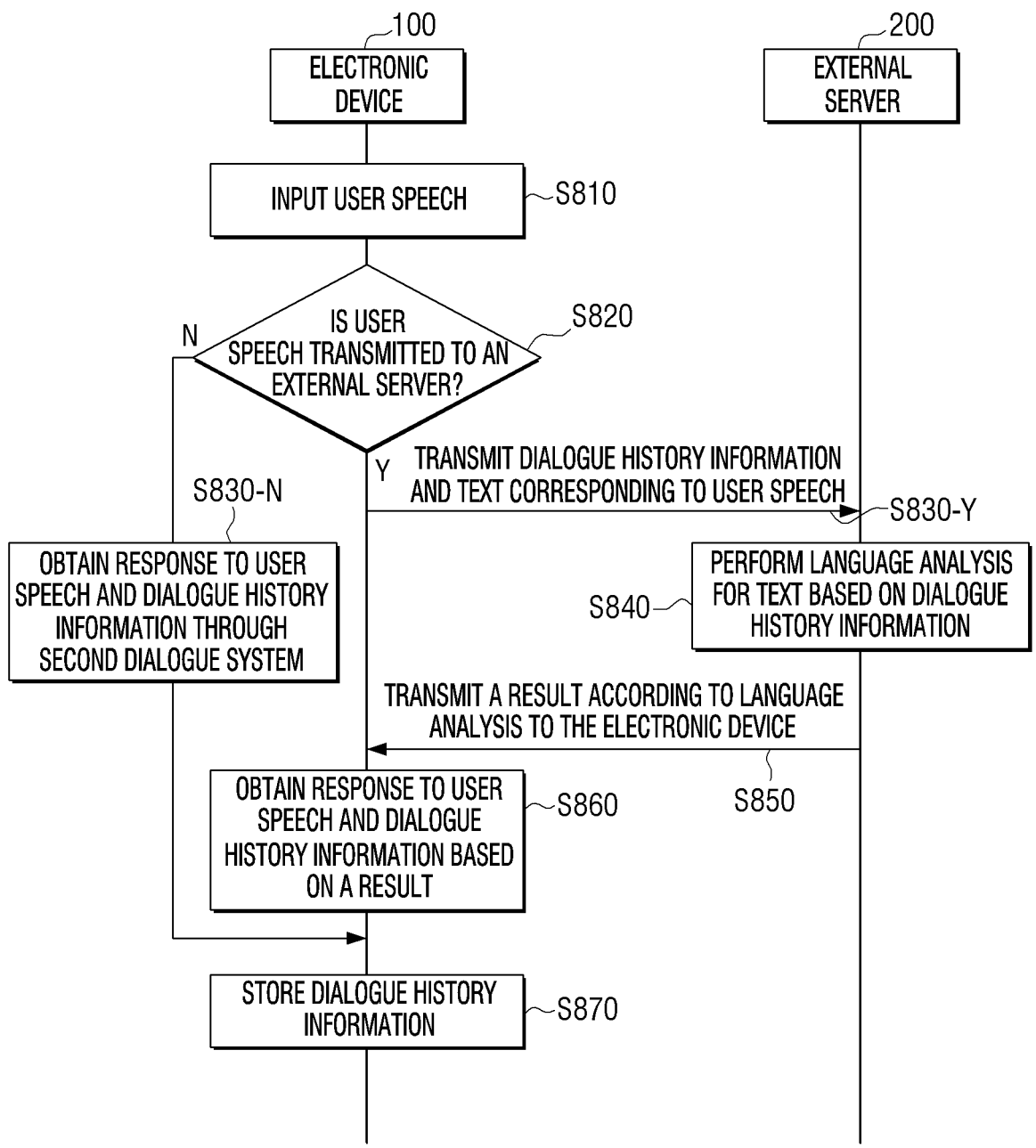
FIGS. 7, 8, and 9 are sequence diagrams illustrating an operation between an electronic device and a server according to various embodiments of the disclosure.

FIG. 7 is a sequence diagram illustrating an operation between an electronic device and a server according to an embodiment of the disclosure.

Referring to FIG. 7, first, if the user speech is input in operation S810, the electronic device 100 can determine whether to transmit the user speech to the server 200 in operation S820. The electronic device 100 may input a user speech to the second dialogue system to obtain a speech recognition confidence value, a domain, a language analysis confidence value of the user speech, and determine whether to transmit the user speech 10 to the server 200 based on the speech recognition confidence value, the language analysis confidence value, and the domain of the obtained user speech. The process of determining whether the electronic device 100 transmits the user speech to the server 200 has been described with reference to FIGS. 2A and 2B, and thus a detailed description thereof will be omitted.

If it is determined that the user speech is not transmitted to the server 200, the electronic device 100 may obtain a response to the user speech through the second dialogue system and dialogue history information for the user speech in operation S820-N.

If it is determined that the user speech is transmitted to the server 200, the electronic device 100 can transmit the pre-stored dialogue history information and the text corresponding to the user speech to the server 200 including the first dialogue system in operation S820-Y. In another embodiment of the disclosure, the electronic device 100 may transmit user speech to the server 200. The server 200 can perform a language analysis on the text based on the dialogue history information in operation S830. Specifically, the server 200 may perform a language analysis based on the text and dialogue history information to obtain a first language analysis result and a first language analysis confidence value, and perform a language analysis based only on the text to obtain a second language analysis result and a second language analysis confidence value.

The server 200 may transmit the results according to the language analysis to the electronic device 100 in operation S840. In one embodiment of the disclosure, if the first language analysis confidence value is higher than the second language analysis confidence value, the server 200 may transmit the first language analysis result to the electronic device 100. In another embodiment of the disclosure, if the second language analysis confidence value is higher than the first language analysis confidence value, the server 200 may identify whether the domain of the text is a domain that can be processed in the electronic device 100 based on information related to the domain of the text in the second language analysis result. For example, if the domain of the text is a domain that may be processed in the electronic device 100, the server 200 may transmit a second language analysis result to the electronic device 100. As another example, if the domain of the text is a domain that cannot be processed in the electronic device 100, the server 200 may obtain the response to the user speech and the dialogue history information associated with the user speech based on the second language analysis result.

The electronic device 100 can obtain a response to the user speech and dialogue history information related to the user speech based on the result received from the server 200 in operation S850. The electronic device 100 can provide speech to the user in operation S860 and store dialogue history information in operation S870. The electronic device 100 and the server 200 may share dialogue history information so that each dialogue system can smoothly output a response to the user speech.

Figure 8:
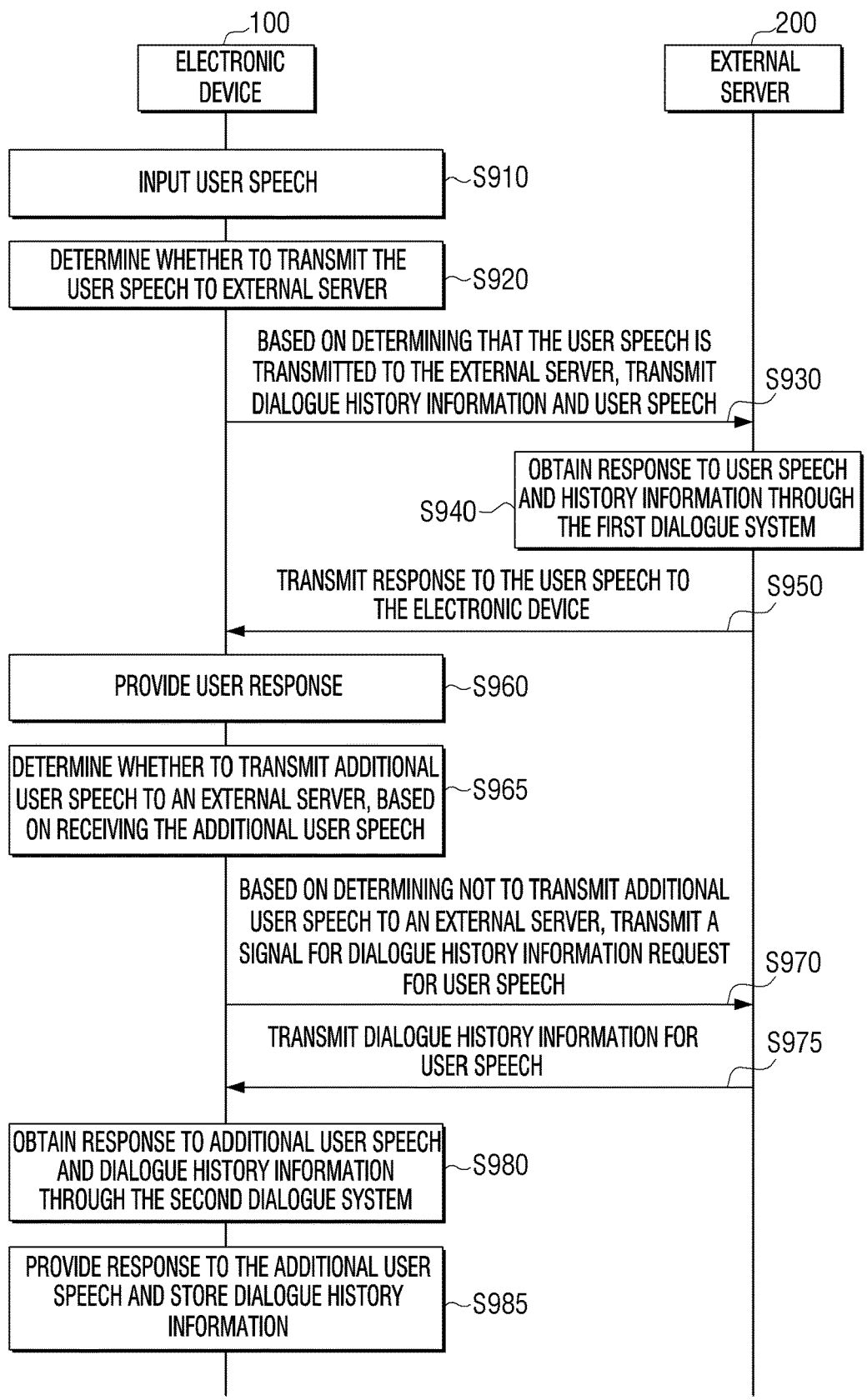

FIG. 8 is a sequence diagram illustrating an operation between an electronic device and a server according to an embodiment of the disclosure.

Referring to FIG. 8, if the user speech is input in operation S910, the electronic device 100 can determine whether to transmit the user speech to the server 200 in operation S920. If it is determined that the user speech is transmitted to the server 200, the electronic device 100 can transmit the dialogue history information and the user speech to the server 200 in operation S930. The server 200 can obtain response and dialogue history information for the user speech through the first dialogue system in operation S940. The server 200 may transmit a response to the user speech to the electronic device 100 in operation S950, and the electronic device 100 can provide the received response in operation S960.

If the additional user speech is input, the electronic device 100 can determine whether to transmit the additional user speech to the server 200 in operation S965. If it is determined that the user speech is not transmitted to the server 200, the electronic device 100 may transmit a signal for a dialogue history information request for the user speech to the server 200 in operation S970. Upon receiving the signal, the server 200 may transmit dialogue history information for the user speech to the electronic device 100 in operation S975. Upon receiving the dialogue history information for the user speech, the electronic device 100 may obtain response and dialogue history information for additional user speech through the second dialogue system in operation S980. Specifically, the electronic device 100 may input dialogue history information and additional user speech associated with the user speech received from the server 200 to the second dialogue system to obtain dialogue history information associated with the additional user speech. The electronic device 100 may provide a response to additional user speech and store dialogue history information associated with the additional user speech in operation S985.

Figure 9:
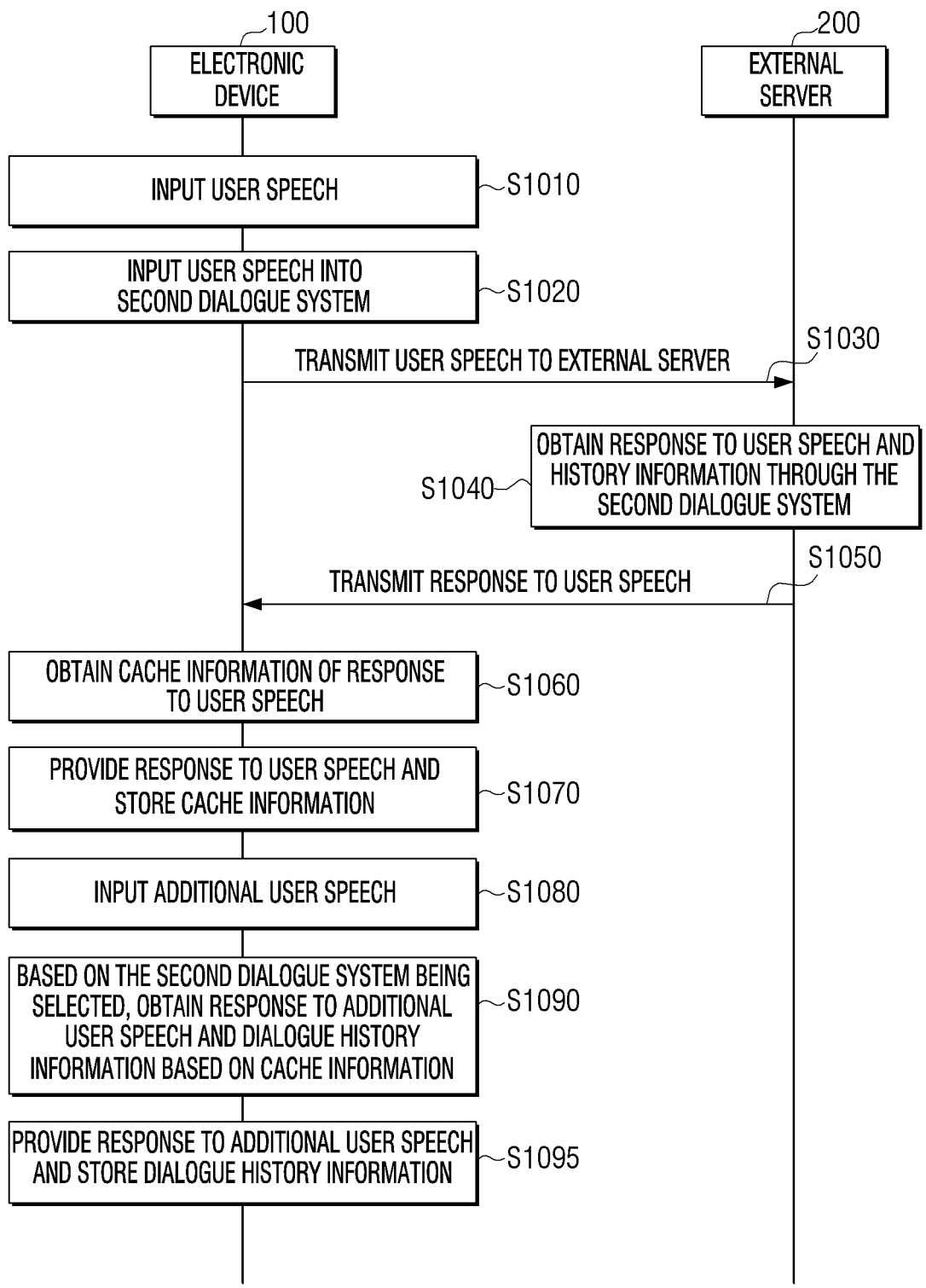

FIG. 9 is a diagram illustrating an operation of an electronic device and a server according to an embodiment of the disclosure. The detailed description of FIG. 8 will be omitted.

Referring to FIG. 9, if the user speech is input in operation in operation S1010, the electronic device 100 may input the user speech to the second dialogue system in operation S1020 and transmit the user speech to the server 200 in operation S1030. In FIG. 9, the electronic device 100 inputs the user speech to the second dialogue system and then transmits the speech to the server 200, but the operations according to each of the operations S1030 and S1040 may be performed simultaneously or within a predetermined time difference.

The server 200 may obtain a response to the user speech and dialogue history information associated with the user speech through the second dialog system in operation S1040. The server 200 may then transmit a response to the user speech to the electronic device 100 in operation S1050.

The electronic device 100 may obtain cache information of the response to the received user speech in operation S1050. Specifically, cache information can be obtained by caching data related to response to user speech in operation S1060. The electronic device 100 may then provide a response to the user speech and store the cache information in operation S1070.

Based on additional user speech being input in operation S1080 and based on the second dialogue system being determined as the dialogue system for providing a response to the user speech from the user, the electronic device 100 may obtain response to the additional user speech and dialogue information associated with the additional user speech based on cache information.

The electronic device 100 may provide a response to additional user speech and store dialogue history information associated with the additional user speech in operation S1095.

Figure 10:
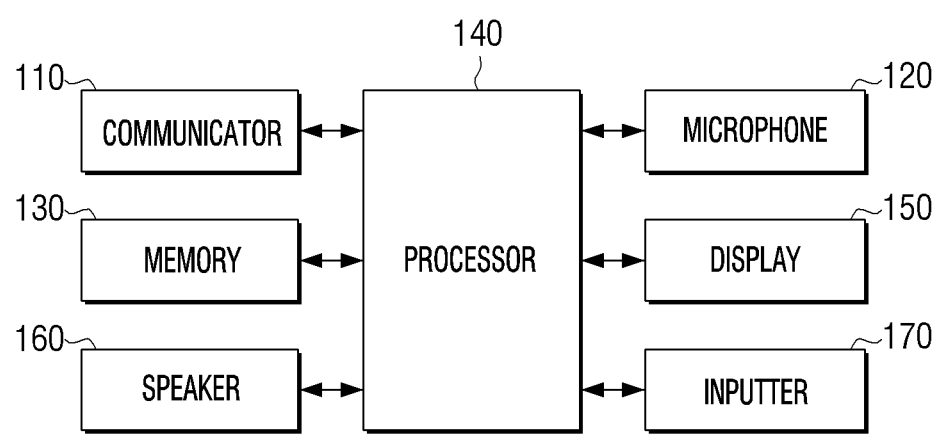
FIG. 10 is a block diagram illustrating a configuration of an electronic device according to an embodiment of the disclosure.

FIG. 10 is a block diagram illustrating a configuration of an electronic device according to an embodiment of the disclosure.

Referring to FIG. 10, the electronic device 100 may include the communicator 110, the microphone 120, the memory 130, the processor 140, the display 150, a speaker 160, and an inputter 170. Since the communicator 110, the microphone 120, the memory 130, and the processor 140 are illustrated in FIG. 4A, a detailed description thereof will be omitted.

The display 150 may display various information under the control of the processor 140. The display 150 may display a user interface (UI) corresponding to the response to the user speech according to the control of the processor 140.

The display 150 may be implemented as a touch screen with a touch panel, but is not limited to the implementations described above and may be implemented differently depending on the type of the electronic device 100.

The speaker 160 may be configured to output various alarm sounds or voice messages as well as various audio data for which various processing operations, such as decoding, amplification, noise filtering, or the like, are performed by an audio processor (not shown). In an embodiment of the disclosure, the speaker 160 may output a response corresponding to the user speech as a format of speech. The speaker 160 is only provided as an embodiment of the disclosure, and may be implemented as another output terminal capable of outputting audio data.

The inputter 170 may receive various user inputs and deliver the user inputs to the processor 140. The inputter 170 may include a touch sensor, a (digital) pen sensor, a pressure sensor, a key, or a microphone. The touch sensor may use, for example, at least one of electrostatic, resistive, infrared, or ultrasonic methods. A (digital) pen sensor may, for example, be part of a touch panel or include a separate recognition sheet. The key may include, for example, a physical button, an optical key, or a keypad. The case of implementing the inputter 170 as a touch sensor has been described with reference to FIG. 7 and will not be further described.

As described above, according to various embodiments of the disclosure, an electronic device may determine a dialogue system to input user speech based on an input user speech, and provide user speech and dialogue history information to the determined dialogue system to obtain a response to the user speech, so that the user can more conveniently utilize the speech recognition technology. The electronic device may obtain a response to the user speech through at least one of the dialogue system stored in the electronic device or the dialogue system stored in the server, so that the user can be provided with a natural response to the user speech even if the user has no idea about which dialogue system is used.

Various embodiments will be described with reference to the attached drawings. However, this disclosure is not intended to limit the embodiments described herein but includes various modifications, equivalents, and/or alternatives. In the context of the description of the drawings, like reference numerals may be used for similar components.

In this disclosure, the expressions "have," "may have," "including," or "may include" may be used to denote the presence of a feature (e.g., components, such as a numerical value, a function, an operation), and does not exclude the presence of additional features.

In this disclosure, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

The terms, such as "first," "second," and so on may be used to describe a variety of elements regardless of order and/or importance, but the elements may not be limited by these terms. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The electronic device according to various embodiments may include, for example, at least one of a smartphone, a tablet personal computer (PC), a desktop PC, a laptop PC, a netbook computer, a server, a personal digital assistant (PDA), a medical device, or a wearable device. In some embodiments of the disclosure, the electronic device may include at least one of, for example, a television, a refrigerator, an air-conditioner, an air purifier, a set-top box, a media box (for example, SAMSUNG HOMESYNC™, APPLE TV™, or GOOGLE TV™).

The term user may refer to a person using an electronic device or a device (e.g., an artificial intelligence electronic device) using the electronic device. The disclosure will now be described in more detail with reference to the drawings.

The embodiments of the disclosure may be implemented as software that includes instructions stored in machine-readable storage media readable by a machine (e.g., a computer). A device may call instructions from a storage medium and that is operable in accordance with the called instructions, including an electronic apparatus (e.g., the electronic device 100). When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium. For example, "non-transitory storage medium" may include a buffer in which data is temporarily stored.

According to embodiments of the disclosure, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium, such as a manufacturer's server, a server in an application store, or a memory in a relay server.

Each of the components (for example, a module or a program) according to the embodiments may be including one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communicator comprising circuitry;
a microphone;
at least one memory configured to store at least one instruction, dialogue history information, and a second dialogue system to provide a response to user speech, wherein the second dialogue system comprises a second automatic speech recognition (ASR) module; and
a processor configured to execute the at least one instruction,
wherein the processor, by executing the at least one instruction, is further configured to:
obtain a text corresponding to a user speech that is input through the microphone and a speech recognition confidence value of the user speech through the second ASR module,
based on the speech recognition confidence value of the user speech exceeding a first threshold, obtain a language analysis confidence value and a domain of the text corresponding to the user speech,
determine whether to transmit the user speech to a server, storing a first dialogue system, based on the speech recognition confidence value of the user speech,
based on determining to transmit the user speech to the server, control the communicator to transmit the user speech and at least a part of the stored dialogue history information to the server,
receive, from the server, one of a first language analysis result or a second language analysis result and dialogue history information associated with the user speech, through the communicator, and
control the received dialogue history information to be stored in the memory.

2. The electronic device of claim 1, wherein the processor is further configured to:
based on the speech recognition confidence value of the user speech being less than or equal to a first threshold value, determine to transmit, to the server, at least one of the user speech or the text corresponding to the user speech, and
based on the speech recognition confidence value of the user speech exceeding the first threshold value, obtain a response to the user speech and dialogue history information associated with the user speech through the second dialogue system.

3. The electronic device of claim 2,
wherein the second dialogue system comprises a second natural language understanding (NLU) module, the language analysis confidence value and the domain of the text corresponding to the user speech being obtained through the second NLU, and
wherein the processor is further configured to:
determine whether to transmit the text corresponding to the user speech to the server based on at least one of a language analysis confidence value or the domain with respect to the text corresponding to the user speech.

4. The electronic device of claim 3, wherein the processor is further configured to:

based on the language analysis confidence value of the text corresponding to the user speech being less than or equal to a second threshold value, determine to transmit the text corresponding to the user speech to the server, and based on the language analysis confidence value of the text corresponding to the user speech exceeding a second threshold value, obtain the response to the user speech and dialogue history information associated with the user speech through the second dialogue system.

5. A server comprising:

a communicator comprising circuitry;

at least one memory configured to store at least one instruction and a first dialogue system; and a processor configured to execute the at least one instruction, wherein the processor, by executing the at least one instruction, is further configured to:

receive, from an electronic device, a text corresponding to a user speech input to the electronic device and dialogue history information stored in the electronic device, through the communicator, the text transmitted based on a confidence value of speech recognition performed by the electronic device on the user speech, obtain a first language analysis result and a first language analysis confidence value by performing language analysis based on the text and the dialogue history information through the first dialogue system, obtain a second language analysis result and a second language analysis confidence value by performing a language analysis based only on the text through the first dialogue system, and control the communicator to transmit, to the electronic device, one of the first language analysis result or the second language analysis result based on the first language analysis confidence value and the second language analysis confidence value, and wherein the received text is processed through a second dialogue system stored in the electronic device.

6. The server of claim 5, wherein the processor is further configured to:

based on the first language analysis confidence value being higher than the second language analysis confidence value, control the communicator to transmit the first language analysis result to the electronic device, and based on the second language analysis confidence value being higher than the first language analysis confidence value, determine whether to transmit the text to the electronic device based on information associated with a domain of the text among the second language analysis results.

7. The server of claim 6, wherein the processor is further configured to:

identify whether the electronic device is capable of processing the domain of the text through the information associated with the domain of the text, and based on identifying that the electronic device is capable of processing the domain of the text, control the communicator to transmit the second language analysis result to the electronic device.

8. The server of claim 7, wherein the processor is further configured to, based on identifying that the electronic device is not capable of processing the domain of the text, obtain a response to the user speech and dialogue history information associated with the user speech based on the second language analysis result.

9. A method of controlling an electronic device comprising a memory storing dialogue history information and a second dialogue system comprising a second automatic speech recognition (ASR) module, the method comprising:

obtaining a text corresponding to an input user speech and a speech recognition confidence value of the user speech through the second ASR module;

based on the speech recognition confidence value of the user speech exceeding a first threshold value, obtaining a language analysis confidence value and a domain of the text corresponding to the user speech;

determining whether to transmit the user speech to a server, including a first dialogue system, based on the speech recognition confidence value of the user speech;

based on determining that the user speech is transmitted to the server, transmitting the user speech and at least a part of the stored dialogue history information to the server;

receiving, from the server, one of a first language analysis result or a second language analysis result and dialogue history information associated with the user speech; and storing the received dialogue history information.

10. The method of claim 9, wherein the determining of whether to transmit the input user speech comprises:

based on the speech recognition confidence value of the user speech being less than or equal to a first threshold value, determining to transmit, to the server, at least one of the user speech or the text corresponding to the user speech, and based on the speech recognition confidence value of the user speech exceeding the first threshold value, obtaining a response to the user speech and dialogue history information associated with the user speech through the second dialogue system.

11. The method of claim 10, wherein the second dialogue system comprises a second natural language understanding (NLU) module, the language analysis confidence value and the domain of the text corresponding to the user speech being obtained through the second NLU, and wherein the determining of whether to transmit the input user speech comprises:

determining whether to transmit the text corresponding to the user speech to the server based on at least one of a language analysis confidence value or the domain with respect to the text corresponding to the user speech.

12. The method of claim 11, wherein the determining of whether to transmit the input user speech comprises:

based on the language analysis confidence value of the text corresponding to the user speech being less than or equal to a second threshold value, determining to transmit the text corresponding to the user speech to the server, and based on the language analysis confidence value of the text corresponding to the user speech exceeding a second threshold value, obtaining the response to the user speech and dialogue history information associated with the user speech through the second dialogue system.

13. A method of controlling a server comprising at least one memory storing a first dialogue system, the method comprising:

receiving, from an electronic device, a text corresponding to a user speech input to the electronic device and dialogue history information stored in the electronic device, the text transmitted based on a confidence value of speech recognition performed by the electronic device on the user speech;

obtaining a first language analysis result and a first language analysis confidence value by performing language analysis based on the text and dialogue history information through the first dialogue system;

obtaining a second language analysis result and a second language analysis confidence value by performing a language analysis based only on the text through the first dialogue system; and transmitting, to the electronic device, one of the first language analysis result or the second language analysis result based on the first language analysis confidence value and the second language analysis confidence value, wherein the received text is processed through a second dialogue system stored in the electronic device.

14. The method of claim 13, wherein the transmitting of the result comprises:

based on the first language analysis confidence value being higher than the second language analysis confidence value, transmitting the first language analysis result to the electronic device, and based on the second language analysis confidence value being higher than the first language analysis confidence value, determining whether to transmit the text to the electronic device based on information associated with a domain of the text among the second language analysis results.

15. The method of claim 14, wherein the transmitting of the result comprises:

identifying whether the electronic device is capable of processing the domain of the text through the information associated with the domain of the text; and based on identifying that the electronic device is capable of processing the domain of the text, transmitting the second language analysis result to the electronic device.

16. The method of claim 15, wherein the transmitting of the result comprises, based on identifying that the electronic device is not capable of processing the domain of the text, obtaining a response to the user speech and dialogue history information associated with the user speech based on the second language analysis result.

* * * * *